(12) United States Patent
Dunn et al.

(10) Patent No.: US 12,118,569 B2
(45) Date of Patent: *Oct. 15, 2024

(54) DATA-DRIVEN TAXONOMY FOR ANNOTATION RESOLUTION

(71) Applicant: LIVEPERSON, INC., New York, NY (US)

(72) Inventors: Matthew Dunn, Arlington, MA (US); Michael Higgins, New York, NY (US)

(73) Assignee: LIVEPERSON, INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/142,092

(22) Filed: May 2, 2023

(65) Prior Publication Data
US 2023/0410123 A1    Dec. 21, 2023

Related U.S. Application Data

(63) Continuation of application No. 17/752,030, filed on May 24, 2022, now Pat. No. 11,676,156.

(60) Provisional application No. 63/192,314, filed on May 24, 2021.

(51) Int. Cl.
| G06F 40/35 | (2020.01) |
| G06F 40/169 | (2020.01) |
| G06Q 30/016 | (2023.01) |
| G06T 11/20 | (2006.01) |
| H04L 51/04 | (2022.01) |

(52) U.S. Cl.
CPC ......... *G06Q 30/016* (2013.01); *G06F 40/169* (2020.01); *G06F 40/35* (2020.01); *G06T 11/206* (2013.01); *H04L 51/04* (2013.01)

(58) Field of Classification Search
CPC .... G06F 40/35; G06F 40/169; G06F 11/3466; G06F 11/3476; G06F 16/3328; G06F 16/9024; H04L 51/04
See application file for complete search history.

(56) References Cited

U.S. PATENT DOCUMENTS

| 6,216,134 B1 * | 4/2001 | Heckerman | G06F 16/358 707/999.005 |
| 8,689,108 B1 * | 4/2014 | Duffield | G06Q 30/02 715/744 |
| 2007/0266039 A1 * | 11/2007 | Boykin | G06F 8/34 707/999.102 |
| 2011/0037766 A1 * | 2/2011 | Judy | G06T 11/206 345/440 |

(Continued)

*Primary Examiner* — Wilson W Tsui
(74) *Attorney, Agent, or Firm* — POLSINELLI LLP

(57) ABSTRACT

An intent confusion evaluation engine receives conversation data corresponding to conversations between customers and agents. The engine evaluates annotations in the conversation data corresponding to intents identified from messages exchanged between customers and agents to determine levels of confusion amongst different intents. Based on these levels of confusion, the engine creates a graphical representation that illustrates the various intents and the level of confusion between different pairings of intents for the set of conversations. If an update is provided to the annotations, the graphical representation is updated dynamically and in real-time to provide updated levels of confusion amongst the various intents in accordance with the update.

18 Claims, 6 Drawing Sheets

(56) References Cited

U.S. PATENT DOCUMENTS

| | | | |
|---|---|---|---|
| 2013/0232452 A1* | 9/2013 | Krajec | G06F 16/258 |
| | | | 715/840 |
| 2016/0212023 A1* | 7/2016 | Mohan | H04L 43/045 |
| 2017/0337293 A1* | 11/2017 | Farkash | G06F 16/254 |
| 2019/0102078 A1* | 4/2019 | Bhatt | G06F 3/0481 |

* cited by examiner

DATA-DRIVEN TAXONOMY FOR ANNOTATION RESOLUTION

CROSS-REFERENCE TO RELATED APPLICATIONS

The present patent application is a continuation of U.S. patent application Ser. No. 17/752,030 filed May 24, 2022, which claims the priority benefit of U.S. Provisional Patent Application No. 63/192,314 filed May 24, 2021, the disclosures of which are incorporated by reference herein.

FIELD

The present disclosure relates generally to systems and methods for evaluating taxonomic ambiguity amongst annotators to resolve annotator confusion in classifying intents. More specifically, techniques are provided to deploy a framework that provides an intent discovery tool that identifies taxonomic ambiguities and provides tools for addressing these taxonomic ambiguities.

SUMMARY

Disclosed embodiments may provide a framework for evaluating taxonomic ambiguity amongst annotators in order to resolve any annotator confusion in classifying different intents. According to some embodiments, a computer-implemented method is provided. The computer-implemented method comprises receiving ongoing conversation data corresponding to conversations between agents and users. The ongoing conversation data includes annotations associated with messages exchanged between the agents and the users. Further, the annotations specify intents. The computer-implemented method further comprises dynamically calculating a set of metrics in real-time. The set of metrics is calculated in real-time as the ongoing conversation data is received. Additionally, the set of metrics is calculated based on the annotations and corresponds to amounts of confusion between pairings of intents. The computer-implemented method further comprises dynamically generating a graphical representation in real-time. The graphical representation depicts amounts of confusion between pairs of nodes using a set of edges. Further, a node corresponds to an intent and an edge corresponds to an amount of confusion between a pairing of intents represented using a pair of nodes. The graphical representation is dynamically updated in real-time as the ongoing conversation data is received.

In some embodiments, the node is sized according to a frequency of the annotations specifying the intent.

In some embodiments, the edge is sized according to the amount of confusion for the pairing of intents.

In some embodiments, the set of edges are generated as a result of corresponding metrics exceeding a minimum amount of confusion threshold value.

In some embodiments, the computer-implemented method further comprises receiving an update to the graphical representation. The update indicates a consolidation of two or more intents into a single intent. The computer-implemented method further comprises determining new amounts of confusion between the single intent and other intents of the set of intents to recalculate the set of metrics. The computer-implemented method further comprises consolidating nodes corresponding to the two or more intents into a single node, wherein the single node corresponds to the single intent. The computer-implemented method further comprises generating new edges between the single node and remaining nodes to indicate the new amounts of confusion between the single intent and other intents.

In some embodiments, the metric corresponds to an average of a conditional probability of a first intent being selected over a second intent and a conditional probability of the second intent being selected over the first intent.

In some embodiments, the computer-implemented method further comprises detecting selection of a node within the graphical representation. The node is associated with a particular intent. The computer-implemented method further comprises dynamically updating the graphical representation to provide in real-time additional metrics corresponding to the particular intent. The additional metrics include a number of messages for which the particular intent was used for annotation of the number of messages.

In an embodiment, a system comprises one or more processors and memory including instructions that, as a result of being executed by the one or more processors, cause the system to perform the processes described herein. In another embodiment, a non-transitory computer-readable storage medium stores thereon executable instructions that, as a result of being executed by one or more processors of a computer system, cause the computer system to perform the processes described herein.

Various embodiments of the disclosure are discussed in detail below. While specific implementations are discussed, it should be understood that this is done for illustration purposes only. A person skilled in the relevant art will recognize that other components and configurations can be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which can be exhibited by some embodiments and not by others.

The terms used in this specification generally have their ordinary meanings in the art, within the context of the disclosure, and in the specific context where each term is used. Alternative language and synonyms can be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles can be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

BRIEF DESCRIPTION OF THE DRAWINGS

The present disclosure is described in conjunction with the appended Figures.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred examples of embodiment(s) only and is not intended to limit the scope, applicability or configuration of the disclosure. Rather, the ensuing description of the preferred examples of embodiment(s) will provide those skilled in the art with an enabling description for implementing a preferred examples of embodiment. It is understood that various changes can be made in the function and arrangement of elements without departing from the spirit and scope as set forth in the appended claims.

Figure 1:
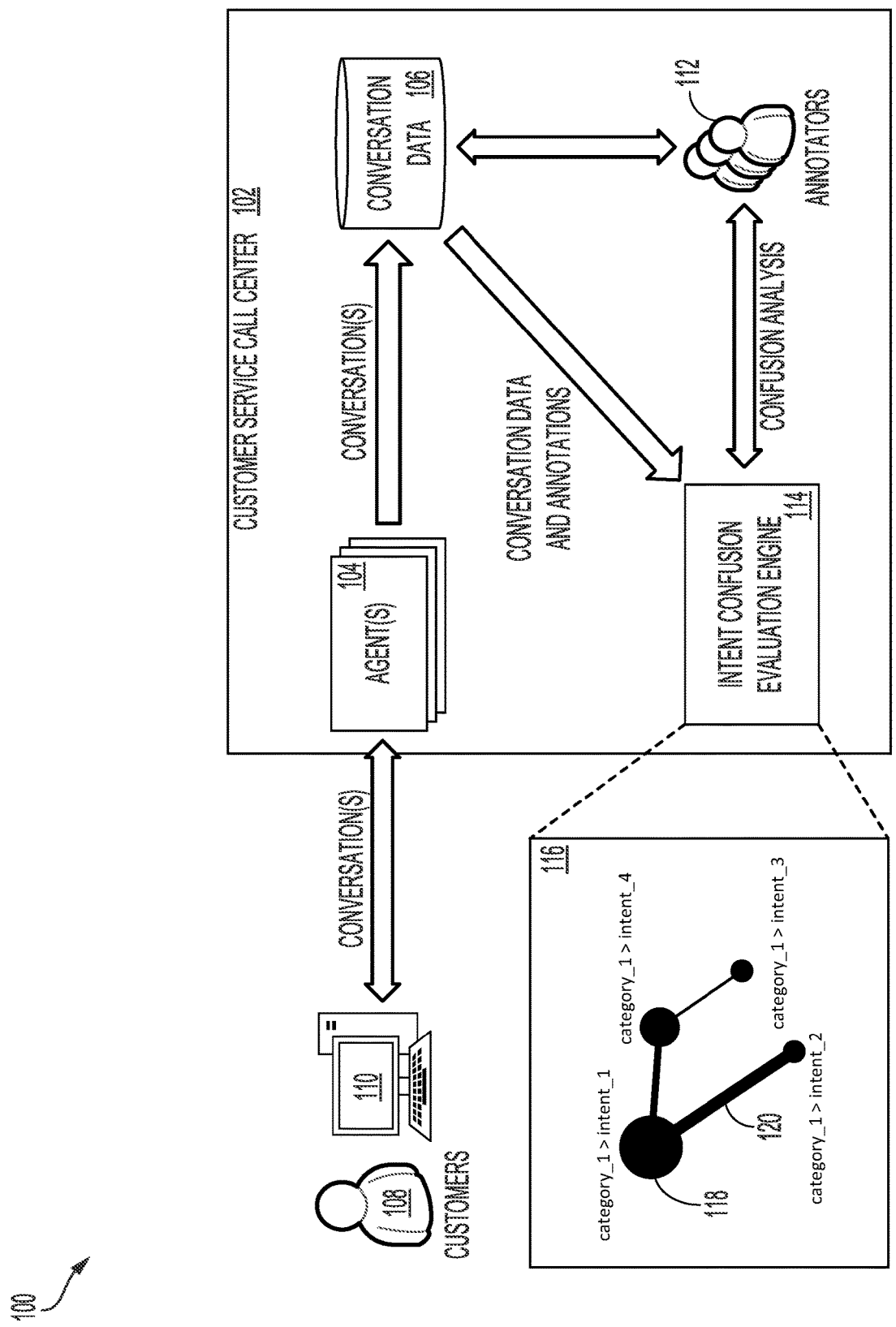
FIG. 1 shows an illustrative example of an environment in which various embodiments can be implemented.

FIG. 1 shows an illustrative example of an environment 100 in which various embodiments can be implemented. In the environment 100, customers 108, via their computing devices 110, may be engaged in communications sessions with different agents 104 of a customer service call center 102. The different agents 104 may include conversational bot agents, which can be configured to autonomously communicate with network devices, such as computing devices 110. Further, conversation bot agents can be configured for a specific capability. Examples of capabilities can include updating database records, providing updates to customers, providing additional data about customers 108 to human agents or other conversation bot agents, determining customer intents and routing the customers 108 to destination systems based on the intents, predicting or suggesting responses to human agents communicating with customers 108, escalating communications sessions to include one or more additional bots or human agents, and other suitable capabilities. In some implementations, while a conversation bot agent is communicating with a customer during a communications session (e.g., using a chat-enabled interface), a communication server (not shown) can automatically and dynamically determine to switch the conversation bot agent with a terminal device utilized by a human agent. For example, conversation bot agents can communicate with customers 108 about certain tasks (e.g., updating a database record associated with a customer), whereas, human agents can communicate with customers 108 about more difficult tasks (e.g., communicating using a communications channel to solve a technical issue).

A conversation bot agent can be code that, when executed, is configured to autonomously communicate with customers 108 via computing devices 110. For example, a conversation bot agent can be a bot that automatically generates messages to initiate conversations with a customer associated with a computing device and/or to automatically respond to messages from the computing device. In an embodiment, the customer service call center 102 can allow clients (e.g., an external system to the platform of the customer service call center 102) to deploy conversation bot agents in their internal communication systems via the customer service call center 102. In some examples, clients can use their own bots in the platform of the customer service call center, which enables clients to implement the methods and techniques described herein into their internal communications systems.

In some implementations, conversation bot agents can be defined by one or more sources. For example, a data store of the customer service call center 102 can store code representing conversation bot agents that are defined (e.g., created or coded) by clients of the customer service call center 102. For example, a client that has defined its own conversation bot agents can load the conversation bot agents to the customer service call center 102. The conversation bot agents defined by clients can be stored in a client bots data store. In some instances, the customer service call center 102 can include a data store that can be used to store code representing conversation bot agents that are defined by third-party systems. For example, a third-party system can include an independent software vendor. Another data store can store code representing conversation bot agents that are defined by an entity associated with the customer service call center 102. For example, conversation bot agents that are coded by the entity can be loaded to or accessible by customer service call center 102, so that the conversation bot agents can be executed and autonomously communicate with customers. In some implementations, customer service call center 102 can access bots stored in these data stores using a cloud network. The cloud network may be any network, and can include an open network, such as the Internet, personal area network, local area network (LAN), campus area network (CAN), metropolitan area network (MAN), wide area network (WAN), wireless local area network (WLAN), a private network, such as an intranet, extranet, or other backbone.

In some embodiments, the customer service call center 102 can recommend automations to cause a conversation to dynamically switch between a conversation bot agent and a customer during a particular communications session between the conversation bot agent and the customer's computing device. For example, the customer service call center 102 can facilitate a communications session between a customer's computing device and a conversation bot agent. The conversation bot agent can be configured to autonomously communicate with the customer's computing device by exchanging one or more messages with the customer's computing device during the communications session. The customer service call center 102 can dynamically determine whether to switch a conversation bot agent with a human agent (or in some cases, vice versa) so that a live human agent can communicate with the customer's computing device, instead of the conversation bot agent. In some implementations, the switching can be performed without a prompt from a customer or a human agent. For example, the switching can be based on message parameters (e.g., scores representing sentiment of a message or series of messages) of the messages exchanged between the customer's computing device and the conversation bot agent, without prompting the computing device to request a transfer to a human agent.

In an embodiment, the customer service call center 102 records conversations between customers 108 and the agents 104 for evaluation in order to enable annotation of these conversations and identify annotation confusion amongst annotators 112. For instance, when a customer engages in a conversation with an agent, the customer service call center 102 may record each message, along with any associated metadata, in a conversation data store 106. Within the conversation data store 106, the customer service call center 102 may associate each message with a unique identifier corresponding to the particular conversation between a customer and an agent. The customer service call center 102 may monitor this conversation to determine whether the conversation between a customer and an agent has concluded. For instance, the customer service call center 102 may determine that a particular conversation has concluded as a result of the customer having submitted a message indicating that a particular issue has been resolved or other acknowledgment of the conclusion of the conversation. In some instances, the customer service call center 102 may determine that a conversation has concluded when the communications session between an agent and a computing device 110 utilized by a customer is terminated.

In an embodiment, a sample set of conversations stored in the conversation data store 106 are provided to a set of annotators 112 for manual evaluation. For example, in some instances, a particular conversation may be provided to a set of annotators 112 to classify each message of the set of conversations as being associated with a particular classification or intent. In an embodiment, each annotator 112 may evaluate each message of the set of conversations and select, from a list of possible intents or other classifications, a particular intent or classification for annotation of the message. For example, an annotator 112 may annotate each message of the set of conversations to indicate the particular intent that the message may be associated with. In some instances, an annotator 112 may use the context surrounding a particular message to annotate the message as being associated with a particular intent or classification.

As annotators 112 assign an intent or classification to each message, the customer service call center 102 may update an entry in the conversation data store 106 corresponding to the message to indicate the intents or classifications assigned to the message by the annotators 112. For instance, if a set of ten annotators are tasked with assigning an intent or classification to a particular message, the customer service call center 102 may record, in an entry corresponding to the message in the conversation data store 106, each of the ten annotations generated by the ten annotators assigning an intent or classification to the message. Thus, an entry corresponding to a particular message may indicate a number of different intents or classifications as determined by the annotators 112, as well as the frequency (e.g., level of agreement) of each intent or classification selected by the annotators 112 for the particular message.

It should be noted that while annotators 112 are used extensively throughout the present disclosure for the purpose of illustration, other techniques or methods may be used to generate a set of annotations (e.g., selection of intents or classifications for each message) for each message of the set of conversations from the conversation data store 106. For example, in an embodiment, the customer service call center 102 can implement a machine learning algorithm or artificial intelligence that is trained to determine the intent or classification for each message of a set of conversations subject to a confidence score. For instance, the customer service call center 102 may utilize a classification model that is trained using sample conversations and corresponding annotations, which may serve as a "ground truth" or sample data set for training of the classification model. Classification models that may be used to annotate messages from different conversations to indicate the intent or classification for each message include a logistic regression algorithm, random forest models, Naïve Bayes models, linear regression models, decision tree models, K-Means clustering models, k-Nearest Neighbors (kNN) models, support-vector machine (SVM) models, gradient boosting machine models, and the like.

In an embodiment, the classification model provides, as output and for each message processed by the classification model, a confidence score for each possible intent or classification that may be assigned to the message. For instance, for a particular message, the classification model may identify a number of possible intents or classifications for the message and a corresponding confidence score for each of these possible intents or classifications identified by the classification model for the particular message.

In an embodiment, an intent confusion evaluation engine 114 of the customer service call center 102 evaluates the conversation data corresponding to conversations between customers 108 and agents 104, as well as the annotations made by the annotators 112 with regard to each message corresponding to these conversations, to determine the level of confusion amongst the annotators 112. The intent confusion evaluation engine 114 may be implemented as an application or other process executed on a computing system of the customer service call center 102. In an embodiment, the intent confusion evaluation engine 114 implements an aggregation strategy to determine the level of confusion amongst annotators 112 for different intent or classification pairings. For instance, the intent confusion evaluation engine 114 may compute the frequency in which a particular intent or classification is selected for the various messages corresponding to the set of conversations between the customers 108 and agents 104. As an illustrative example, if a particular message has been evaluated by three annotators 112 and one of the annotators has classified the message as being associated with an intent or classification that is different from that selected by the other annotators, the intent confusion evaluation engine 114 may determine that there is a level of confusion amongst the three annotators 112 corresponding to the different intents or classifications selected by the three annotators 112 for the message.

In some instances, the intent confusion evaluation engine 114 may calculate or otherwise determine a metric corresponding to the level of confusion detected amongst a set of annotators. For example, the intent confusion evaluation engine 114, for each message and for each intent or classification pairing, may determine the average number of times that an annotator selected a particular intent or classification over a different intent or classification selected by another annotator for the message. As an illustrative example, if an annotator has picked intent A for a particular message that a different annotator has picked intent B, the intent confusion evaluation engine 114 may calculate the following metric according to Eq. 1 to denote the level of confusion between annotators for these two intents:

$$\frac{p(A \mid B) + p(B \mid A)}{2} \qquad \text{(Eq. 1)}$$

where p(A|B) denotes the conditional probability of the selection of intent A given the selection of intent B and p(B|A) denotes the conditional probability of the selection of intent B given the selection of intent A.

In an embodiment, the intent confusion evaluation engine 114 can generate a graphical representation 116 of the level of confusion amongst annotators 112 in their annotation of messages corresponding to a set of conversations from the conversation data store 106. For example, as illustrated in FIG. 1, the intent confusion evaluation engine 114 may define a node 118 corresponding to each intent or classification selected by the annotators 112. The size of each node 118 represented in the graphical representation 116 may be determined based on the frequency of annotators 112 applying this intent or classification to messages associated with the set of conversations being evaluated from the conversation data store 106. For instance, a node corresponding to an intent or classification that is frequently selected by annotators 112 may have a larger size compared to a node correspond to an intent or classification that is less frequently selected by annotators 112. In some instances, the intent confusion evaluation engine 114 may utilize an algorithm to determine the size of each node corresponding to a particular intent or classification, as well as to determine the color and/or shape of each node. For instance, nodes may be assigned a particular set of colors according to the intent or classification type or category of the underlying intents or classifications. For example, intents or classifications corresponding to product characteristics and reviews may be assigned a particular color (with corresponding shades), whereas intents or classifications corresponding to payments may be assigned a different color (with corresponding shades).

In addition to generating nodes 118 for each intent or classification selected by the annotators 112, the intent confusion evaluation engine 114 may generate an edge 120 between two nodes for which a level of confusion between the two nodes has been detected. In an embodiment, the intent confusion evaluation engine 114 determines the size of an edge 120 between two nodes based on the level of confusion corresponding to the selection of the intents or classifications associated with the two nodes. For instance, if there is a significant level of confusion between a pair of intents or classifications, the intent confusion evaluation engine 114 may generate an edge between the nodes corresponding to the pair of intents or classifications that has a greater thickness. Alternatively, if there is a minimal level of confusion between a pair of intents or classifications, the intent confusion evaluation engine 114 may generate an edge between the nodes corresponding to the pair of intents of classifications that has a lesser thickness. In an embodiment, the intent confusion evaluation engine 114 utilizes an algorithm to determine a minimum level of confusion required for defining an edge between two nodes associated with a pair of intents or classifications. In some instances, an edge between a two nodes may be generated if the level of confusion between the pair of intents or classifications associated with these two nodes satisfies a level of confusion threshold. For instance, using a metric calculated using Eq. 1 above, the intent confusion evaluation engine 114 may determine whether the metric exceeds the a minimum level of confusion threshold value. If so, the intent confusion evaluation engine 114 may define an edge between the two nodes corresponding to this pair of intents or classifications.

In an embodiment, the intent confusion evaluation engine 114 provides the graphical representation 116 of the level of confusion amongst annotators 112 for different pairings of intents or classifications to administrators or expert annotators for review. The graphical representation 116 of the level of confusion amongst annotators 112 may be provided via an interface or portal provided by the customer service call center 102 and accessible via a computing device utilized by an administrator or expert annotator. The graphical representation 116 may include the various nodes 118 corresponding to the different intents or classifications selected by annotators 112, as well as any edges 120 between these various nodes 118, which may graphically represent the level of confusion amongst annotators 112 between different nodes 118. In some instances, in addition to providing the aforementioned graphical representation 116 of the level of confusion amongst annotators 112 for different pairings of intents or classifications, the intent confusion evaluation engine 114 may provide insights that may be used by an administrator or expert annotator in addressing confusion amongst annotators 112. For instance, if the level of confusion between two intents or classifications is significant for particular message types, an administrator or expert annotator may generate updates to the list of intents or classifications to reduce the likelihood of annotators 112 being confused between these intents or classifications for similar messages.

In an embodiment, using the graphical representation 116, an administrator or expert annotator can dynamically provide an update to consolidate two or more intents or classifications to reduce the likelihood of annotator confusion. For instance, an administrator or expert annotator may interact with the different nodes 118 within the graphical representation 116 to identify the corresponding intents or classifications and the corresponding edges 120 to determine the level of confusion amongst annotators 112 for these particular intents or classifications. An administrator or expert annotator may submit a request, to the intent confusion evaluation engine 114, to consolidate two or more of these nodes 118 into a singular node corresponding to an intent or classification encompasses the intents or classifications associated with the two or more nodes 118. For example, when an administrator or expert annotator interacts with a particular node via the graphical representation 116, the intent confusion evaluation engine 114 may provide the administrator or expert annotator with one or more options to dynamically change or otherwise update the intent or classification for the particular node. As an illustrative example, if an administrator or expert annotator selects a particular node from the graphical representation 116, the intent confusion evaluation engine 114 can present, via the graphical representation 116, a listing of the various intents or classifications available to annotators 112. The administrator or expert annotator may select an intent or classification from this listing to request an update to the particular node to associate the particular node with the selected intent or classification. In some instances, the administrator or expert annotator may generate a new intent or classification that can be designated to the particular node. The intent confusion evaluation engine 114 may assign the new intent or classification to the particular node and update the listing of the various intents or classifications available to annotators 112 to incorporate the newly generated intent or classification.

In an embodiment, if an administrator or expert annotator updates one or more nodes 118 within the graphical representation 116 such that two or more nodes are associated with the same intent or classification, the intent confusion evaluation engine 114 can, dynamically and in real-time, update the graphical representation 116 to provide a new level of confusion amongst annotators 112 for the different pairings of intents or classifications. For instance, the intent confusion evaluation engine 114 may, dynamically and in real-time, update the entries corresponding to the messages that may have been previously annotated with the intents or classifications being replaced by the new intent or classification selected by the administrator or expert annotator to include new annotations corresponding to the new intent or classification. For example, if an entry for a message includes four annotations corresponding to a replaced intent or classification, the intent confusion evaluation engine 114 may update the entry such that these four annotations now correspond to the new intent or classification selected by the administrator or expert annotator.

Once the intent confusion evaluation engine 114 has updated the one or more message entries in the conversation data store 106 affected by the change in the intent or classification of one or more nodes 118, the intent confusion evaluation engine 114 may, dynamically and in real-time, re-evaluate the conversation data corresponding to conversations between customers 108 and agents 104, as well as the updated annotations with regard to each message corresponding to these conversations, to determine a new level of confusion amongst the annotators 112 corresponding to the updated annotations. Based on the resulting level of confusion corresponding to the updated annotations, the intent confusion evaluation engine 114 can update the graphical representation 116 of the level of confusion amongst annotators 112 in their annotation of messages corresponding to the set of conversations from the conversation data store 106. For instance, the intent confusion evaluation engine 114 may update the graphical representation 116 to include nodes 118 corresponding to the selected intent or classification provided by the administrator or expert annotator and any other unchanged intents or classifications, as annotated by the annotators 112 or provided by the machine learning algorithm described above.

The size of each node 118 represented in the updated graphical representation 116 may again be determined based on the frequency of the corresponding intent or classification to messages associated with the set of conversations being evaluated from the conversation data store 106. Thus, the size and number of nodes 118 within the graphical representation 116 may dynamically change in response to the updates to one or more nodes 118 within the graphical representation 116 provided by an administrator or expert annotator to associate these one or more nodes 118 with new or alternative intents or classifications.

In addition to updating the nodes 118 within the graphical representation 116 in response to a change in the intent or classification of one or more nodes, the intent confusion evaluation engine 114 may further update the edges 120 between the updated nodes 118 to represent the level of confusion between each pairing of nodes for which a level of confusion has been detected. The intent confusion evaluation engine 114 may determine the size of each edge 120 based on the level of confusion corresponding to the selection of the intents or classifications associated with the two nodes in a pairing, as described above. Thus, in response to an update to the intent or classification for a particular node, the intent confusion evaluation engine 114 may dynamically and in real-time update the graphical representation 116 to provide updated insights into the level of confusion that may occur as a result of a change (e.g., consolidation, re-labeling, etc.) to one or more intents or classifications.

In an embodiment, the intent confusion evaluation engine 114 can dynamically update the graphical representation 116 for ongoing conversations between customers 108 and agents 104 as messages are exchanged and annotated by annotators 112 and/or the intent confusion evaluation engine 114. For instance, as messages are exchanged between customers 108 and agents 104 during ongoing conversations, the annotators 112 and/or the intent confusion evaluation engine 114 may immediately, and in real-time, process and annotate these messages. As new annotations and/or confidence scores are generated for ongoing conversations, the intent confusion evaluation engine 114 may dynamically, and in real-time, determine a new level of confusion amongst the annotators 112 corresponding to the new annotations. Based on the resulting level of confusion corresponding to the new annotations, the intent confusion evaluation engine 114 can update, dynamically and in real-time, the graphical representation 116 of the level of confusion amongst annotators 112 in their annotation of messages corresponding to the set of ongoing conversations.

As an illustrative example, while an administrator or expert annotator is interacting with the graphical representation 116, the intent confusion evaluation engine 114 may dynamically, and in real-time, continue to process new annotations as they are determined based on the dynamic and real-time analysis of messages corresponding to ongoing conversations between customers 108 and agents 104. The intent confusion evaluation engine 114 may dynamically re-calculate the set of metrics in real-time that correspond to the amounts or levels of confusion between the various pairings of intents. Based on this re-calculation of the set of metrics, the intent confusion evaluation engine 114 may dynamically update the graphical representation 116 in real-time to depict the updated amounts of confusion between the pairs of nodes 118. For instance, as the administrator or expert is interacting with the graphical representation 116, the intent confusion evaluation engine 114 may dynamically and in real-time update the sizes of the various nodes 118 and edges 120 within the graphical representation 116 as new annotations are received for the ongoing conversations between the customers 108 and agents 104. Thus, an administrator or expert annotator reviewing the graphical representation 116 may see the nodes 118 and edges 120 representing the various intents and amounts of confusion amongst intents, respectively, dynamically change in realtime as new messages corresponding to ongoing conversations are processed in real-time.

Figure 2:
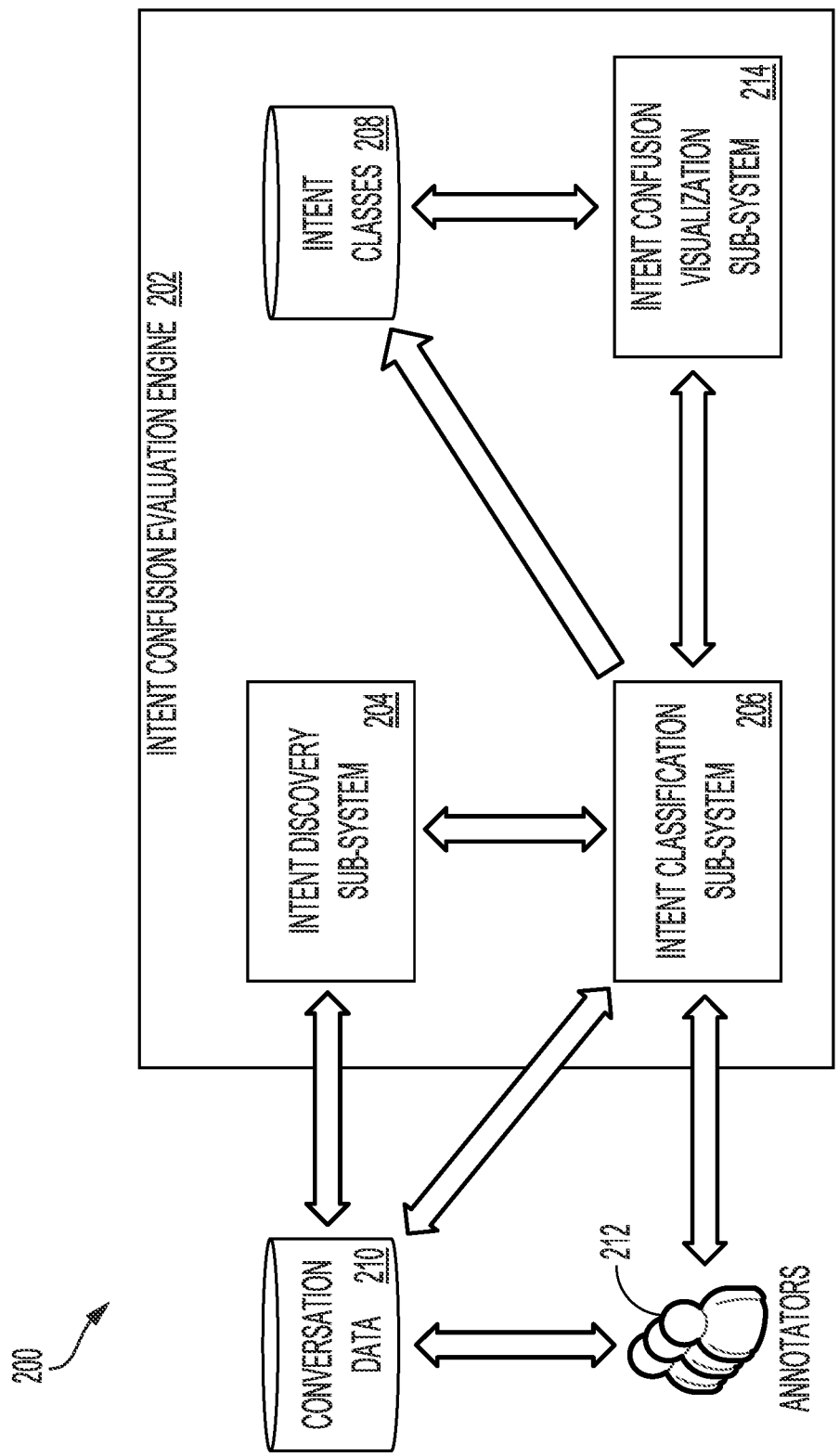
FIG. 2 shows an illustrative example of an environment in which an intent confusion evaluation engine processes conversation data and annotations made by a pool of annotators regarding intents of historical conversations to identify intent confusion within the pool of annotators in accordance with at least one embodiment.

FIG. 2 shows an illustrative example of an environment 200 in which an intent confusion evaluation engine 202 processes conversation data and annotations made by a pool of annotators 212 regarding intents or classifications of historical conversations to identify intent confusion within the pool of annotators 212 in accordance with at least one embodiment. In the environment 200, a pool of annotators 212 may be tasked with evaluating messages from a set of conversations stored in a conversation data store 210 to identify corresponding intents or classifications for these messages. For instance, a set of conversations stored in the conversation data store 210 may be provide to the pool of annotators 212 for manual evaluation. As an illustrative example, a particular conversation from the conversation data store 210 may be provided to a set of annotators 212 to identify the intent or classification for each message of the conversation. In an embodiment, each annotator may evaluate each message of a particular conversation and denote, for each message, a particular intent or classification.

In an embodiment, the intent confusion evaluation engine 202 includes an intent classification sub-system 206, which may maintain a list or other repository of available intents or classifications that may be assigned to messages by the annotators 212. The intent classification sub-system 206 may be implemented as an application or other process executed on a computing system of the intent confusion evaluation engine 202. The intent classification sub-system 206 may provide the list or other repository of available intents or classifications to the annotators 212 for annotation of the messages corresponding to a set of conversations from the conversation data store 210.

As noted above, the customer service call center can record conversations between customers and agents for evaluation in order to enable annotation of these conversations and identify annotation confusion amongst annotators 212. In an embodiment, the intent classification sub-system 206 transmits an instruction or other request to the annotators 212 to annotate a set of conversations from the conversation data store 210. For instance, the intent classification sub-system 206 may transmit an instruction or other request to the annotators 212 in response to a request from an administrator or expert annotator to obtain annotations from the annotators 212 in order to determine the level of confusion (if any) amongst the annotators 212 for a variety of intents or classifications. Alternatively, the intent classification sub-system 206 may transmit an instruction or other request periodically (e.g., daily, weekly, monthly, etc.) to the annotators 212 to annotate the set of conversations from the conversation data store 210. In some instances, the intent classification sub-system 206 can transmit an instruction or other request to the annotators 212 in response to a triggering event. For instance, the intent classification sub-system 206 may prompt the annotators 212 to annotate conversations from the conversation data store 210 once a threshold number of conversations have been recorded and stored in the conversation data store 210. Additionally, or alternatively, the intent classification sub-system 206 can prompt the annotators 212 to annotate a particular conversation in response to a negative customer interaction with an agent or conversational bot agent during the particular conversation. As another example, the intent classification sub-system 206 can prompt the annotators 212 to annotate the particular example in response to the conversation being transferred to a human agent from a conversational bot agent.

As noted above, as annotators 212 assign an intent or classification to each message, the entry in the conversation data store 210 corresponding to the message may be updated to indicate the intents or classifications assigned to the message by the annotators 212. An entry corresponding to a particular message may indicate a number of different intents or classifications as determined by the annotators 212, as well as the frequency (e.g., level of agreement) of each intent or classification selected by the annotators 212 for the particular message.

In an embodiment, the intent confusion evaluation engine 202 implements an intent discovery sub-system 204, which may automatically and autonomously process the conversations in the conversation data store 210 and provide annotations to messages within these conversations. The intent discovery sub-system 204 may be implemented as an application or other process executed on a computing system of the intent confusion evaluation engine 202. In an embodiment, the intent discovery sub-system 204 can implement a machine learning algorithm or artificial intelligence that is trained to determine the intent or classification for each message of a set of conversations from the conversation data store 210 subject to a confidence score. For instance, the intent discovery sub-system 204 may utilize a classification model that is trained using sample conversations and corresponding annotations, which may serve as a "ground truth" or sample data set for training of the classification model. The classification model may provide, as output and for each message processed by the classification model, a confidence score for each possible intent or classification that may be assigned to the message. For instance, for a particular message, the classification model may identify a number of possible intents or classifications for the message and a corresponding confidence score for each of these possible intents or classifications identified by the classification model for the particular message.

In an embodiment, the intent classification sub-system 206 evaluates the conversation data from the conversation data store 210, as well as the annotations made by the annotators 212 and/or the intent discovery sub-system 204 (e.g., confidence scores for different intents/classifications per message, etc.) with regard to each message corresponding to these conversations, to determine the level of confusion amongst the annotators 212 and/or the machine learning algorithm utilized by the intent discovery sub-system 204. In an embodiment, the intent classification sub-system 206 implements an aggregation strategy to determine the level of confusion amongst annotators 212 and/or the machine learning algorithm utilized by the intent discovery sub-system 204 for different intent or classification pairings. For instance, the intent classification sub-system 206 may compute the frequency in which a particular intent or classification is selected for the various messages corresponding to the set of conversations. In an embodiment, the intent classification sub-system 206 can store, in an intent classes data store 208, the intents or classifications identified by the annotators 212 and/or the intent discovery sub-system 204, as well as any metrics corresponding to the level of confusion amongst the annotators 212 and/or the machine learning algorithm utilized by the intent discovery sub-system 204, as described herein.

As noted above, a metric corresponding to the level of confusion detected amongst a set of annotators 212 and/or the machine learning algorithm may be calculated or otherwise determined. For instance, the intent classification sub-system 206 may, for each message and for each intent or classification pairing, determine the average number of times that an annotator (e.g., human annotator and/or the machine learning algorithm) selected or scored a particular intent or classification over a different intent or classification selected by another annotator for the message. An example of a metric that may be calculated to denote the level of confusion between annotators 212 and/or the intent discovery sub-system 204 for a pair of intents is described above in connection with Eq. 1. The metrics calculated by the intent classification sub-system 206 may be stored in the intent classes data store 208, as described above.

The intent confusion evaluation engine 202, via an intent confusion visualization sub-system 214, can generate a graphical representation of the level of confusion amongst annotators 212 and/or the intent discovery sub-system 204 in their annotation of messages corresponding to the set of conversations from the conversation data store 210. The intent confusion visualization sub-system 214 may be implemented as an application or other process executed on a computing system of the intent confusion evaluation engine 202. The intent confusion visualization sub-system 214 may generate a graphical representation of the level of confusion amongst annotators 212 and/or the intent discovery sub-system 204 automatically in response to an indication from the intent classification sub-system 206 that it has completed generating metrics for different annotations and annotation pairings for a set of conversations from the conversation data store 210. For instance, when the intent classification sub-system 206 completes calculating the various metrics for the annotations and annotation pairings corresponding to a set of conversations, the intent classification sub-system 206 can transmit a notification to the intent confusion visualization sub-system 214 to generate a graphical representation of the level of confusion amongst annotators for the annotations selected by these annotations for the set of conversations. The notification may include an identifier corresponding to an entry in the intent classes data store 208 that incorporates the metrics calculated by the intent classification sub-system 206 for the set of conversations. Thus, in response to the notification, the intent confusion visualization sub-system 214 may query the intent classes data store 208 to obtain the requisite data (e.g., set of metrics corresponding to annotations for a set of conversations, etc.) needed to generate the graphical representation of the level of confusion amongst annotators 212 and/or the intent discovery sub-system 204 in their annotation of messages corresponding to the set of conversations.

In some instances, the intent confusion visualization sub-system 214 may generate the graphical representation of the level of confusion amongst annotators 212 and/or the intent discovery sub-system 204 in their annotation of messages corresponding to the set of conversations in response to a request from an administrator or expert annotator to generate the graphical representation. For instance, the intent confusion visualization sub-system may provide an interface, such as a graphical user interface (GUI), through which users (e.g., administrators, expert annotators, etc.) may request generation of a graphical representation of annotator confusion for a set of conversations. For example, via the GUI, an administrator or expert annotator may specify that it would like to obtain a graphical representation of annotator confusion for conversations associated with a particular brand. As another example, via the GUI, an administrator or expert annotator may specify that it would like to obtain a graphical representation of annotator confusion for conversations associated with one or more intent classes (e.g., sales, technical support, billing, etc.) for a particular brand or other organizational structure. In response to the request, the intent confusion visualization sub-system 214 may query the intent classes data store 208 to obtain metrics corresponding to annotations made for the relevant set of conversations. Using these metrics, the intent confusion visualization sub-system 214 may generate the appropriate graphical representation for the administrator or expert annotator.

As noted above, a node may be generated in the graphical representation of annotator confusion corresponding to each intent or classification selected by the annotators 212 and/or identified by the intent discovery sub-system 204 via the machine learning algorithm (e.g., any intent or classification having a corresponding confidence score above a threshold, etc.). The intent confusion visualization sub-system 214 may determine the size of each node represented in the graphical representation based on the frequency of annotators 212 applying this intent or classification to messages associated with the set of conversations being evaluated from the conversation data store 210. In some instances, the intent confusion visualization sub-system 214 may utilize an algorithm to determine the size of each node corresponding to a particular intent or classification, as well as to determine the color and/or shape of each node. For instance, nodes may be assigned a particular set of colors according to the intent or classification type or category of the underlying intents or classifications.

In addition to generating nodes for each intent or classification selected by the annotators 212 and/or identified by the intent discovery sub-system 204 for the set of conversations, the intent confusion visualization sub-system 214 may generate an edge between two nodes for which a level of confusion between the two nodes has been detected. As noted above, the intent confusion visualization sub-system 214 may determine the size of an edge between two nodes based on the level of confusion corresponding to the selection of the intents or classifications associated with the two nodes. In an embodiment, the intent confusion visualization sub-system 214 utilizes an algorithm to determine a minimum level of confusion required for defining an edge between two nodes associated with a pair of intents or classifications. In some instances, an edge between a two nodes may be generated if the level of confusion between the pair of intents or classifications associated with these two nodes satisfies a level of confusion threshold. For instance, using a metric calculated using Eq. 1 above, the intent confusion visualization sub-system 214 may determine whether the metric exceeds the a minimum level of confusion threshold value. If so, the intent confusion visualization sub-system 214 may define an edge between the two nodes corresponding to this pair of intents or classifications.

Once the intent confusion visualization sub-system 214 has generated the graphical representation of the level of confusion amongst annotators 212 for different pairings of intents or classifications, the intent confusion visualization sub-system 214 may update the GUI to present this graphical representation to the administrator or expert annotator. The graphical representation may include the various nodes corresponding to the different intents or classifications selected by annotators 212 and/or identified by the intent discovery sub-system 204, as well as any edges between these various nodes, which may graphically represent the level of confusion amongst annotators 212 and/or the intent discovery sub-system 204 between different nodes. In some instances, in addition to providing the aforementioned graphical representation of the level of confusion for different pairings of intents or classifications, the intent confusion visualization sub-system 214 may provide insights that may be used by an administrator or expert annotator in addressing confusion amongst annotators 212 and/or the intent discovery sub-system 204. For instance, if the level of confusion between two intents or classifications is significant for particular message types, an administrator or expert annotator may generate updates to the list of intents or classifications to reduce the likelihood of annotators 212 and/or the intent discovery sub-system 204 being confused between these intents or classifications for similar messages.

Through the interface provided by the intent confusion visualization sub-system 214, an administrator or expert annotator may interact with the graphical representation of the level of confusion for pairings of intents or classifications to consolidate two or more intents or classifications in order to reduce the likelihood of annotator confusion. An administrator or expert annotator may interact with the different nodes within the GUI to identify the corresponding intents or classifications and the corresponding edges to determine the level of confusion amongst annotators 212 and/or the intent discovery sub-system 204 for these particular intents or classifications. In an embodiment, an administrator or expert annotator, through the GUI, can submit a request to consolidate two or more of these nodes into a singular node corresponding to an intent or classification that encompasses the intents or classifications associated with the two or more nodes. For example, when an administrator or expert annotator interacts with a particular node via the GUI, the intent confusion visualization sub-system 214 may provide the administrator or expert annotator with one or more options to dynamically change or otherwise update the intent or classification for the particular node. As an illustrative example, if an administrator or expert annotator selects a particular node from the GUI, the intent confusion visualization sub-system 214 can query the intent classes data store 208 to identify a listing of the various intents or classifications available to annotators 212 for the set of conversations. The intent confusion visualization sub-system 214 may present, via the GUI, this listing of the various intents or classifications available to annotators 212. The administrator or expert annotator may select an intent or classification from this listing to request an update to the particular node to associate the particular node with the selected intent or classification. In some instances, the administrator or expert annotator may generate a new intent or classification that can be designated to the particular node. The intent confusion visualization sub-system 214 may assign the new intent or classification to the particular node and update the listing of the various intents or classifications available to annotators 212 to incorporate the newly generated intent or classification.

If an administrator or expert annotator updates one or more nodes within the GUI such that two or more nodes are associated with the same intent or classification, the intent confusion visualization sub-system 214 may, dynamically and in real-time, update the GUI to provide a new level of confusion amongst annotators 212 and/or the intent discovery sub-system 204 for the different pairings of intents or classifications. For instance, in response to an update provided by an administrator or expert annotator, the intent confusion visualization sub-system 214 may transmit information corresponding to the update to the intent classification sub-system 206. The intent classification sub-system 206, in response to the update submitted by the administrator or expert annotator may, dynamically and in real-time, update the entries corresponding to the messages that may have been previously annotated with the intents or classifications being replaced by the new intent or classification selected by the administrator or expert annotator to include new annotations corresponding to the new intent or classification. For example, if an entry for a message includes four annotations corresponding to a replaced intent or classification, the intent classification sub-system 206 may update the entry such that these four annotations now correspond to the new intent or classification selected by the administrator or expert annotator. The intent classification sub-system 206 may update the entries corresponding to the set of conversations impacted by this update in the intent classes data store 208 to incorporate the updated annotations.

Once the intent classification sub-system 206 has updated these entries, the intent classification sub-system 206 may re-evaluate the conversation data corresponding to conversations between customers and agents, as well as the updated annotations with regard to each message corresponding to these conversations, to determine a new level of confusion amongst the annotators 212 and/or the intent discovery sub-system 204 corresponding to the updated annotations. The intent classification sub-system 206 may transmit a notification to the intent confusion visualization sub-system 214 to indicate that the update submitted by the administrator or expert annotator has been applied to the set of conversations for which the level of confusion amongst annotators 212 and/or the intent discovery sub-system 204 is presented. This may cause the intent confusion visualization sub-system 214 to dynamically, and in real-time, update the graphical representation of the level of confusion amongst annotators 212 and/or the intent discovery sub-system 204 in their annotation of messages corresponding to the set of conversations from the conversation data store 210. For instance, the intent confusion visualization sub-system 214 may update the graphical representation to include nodes corresponding to the selected intent or classification provided by the administrator or expert annotator and any other unchanged intents or classifications, as annotated by the annotators 212 or provided by the intent discovery sub-system 204.

The intent confusion visualization sub-system 214 may determine the size of each node represented in the updated graphical representation based on the frequency of the corresponding intent or classification to messages associated with the set of conversations. Thus, the size and number of nodes within the GUI may dynamically change in response to the updates to one or more nodes within the GUI provided by an administrator or expert annotator to associate these one or more nodes with new or alternative intents or classifications. In addition to updating the nodes within the GUI in response to a change in the intent or classification of one or more nodes, the intent confusion visualization sub-system 214 may further update the edges between the updated nodes to represent the level of confusion between each pairing of nodes for which a level of confusion has been detected. The intent confusion visualization sub-system 214 may determine the size of each edge based on the level of confusion corresponding to the selection of the intents or classifications associated with the two nodes in a pairing, as described above.

Figure 3:
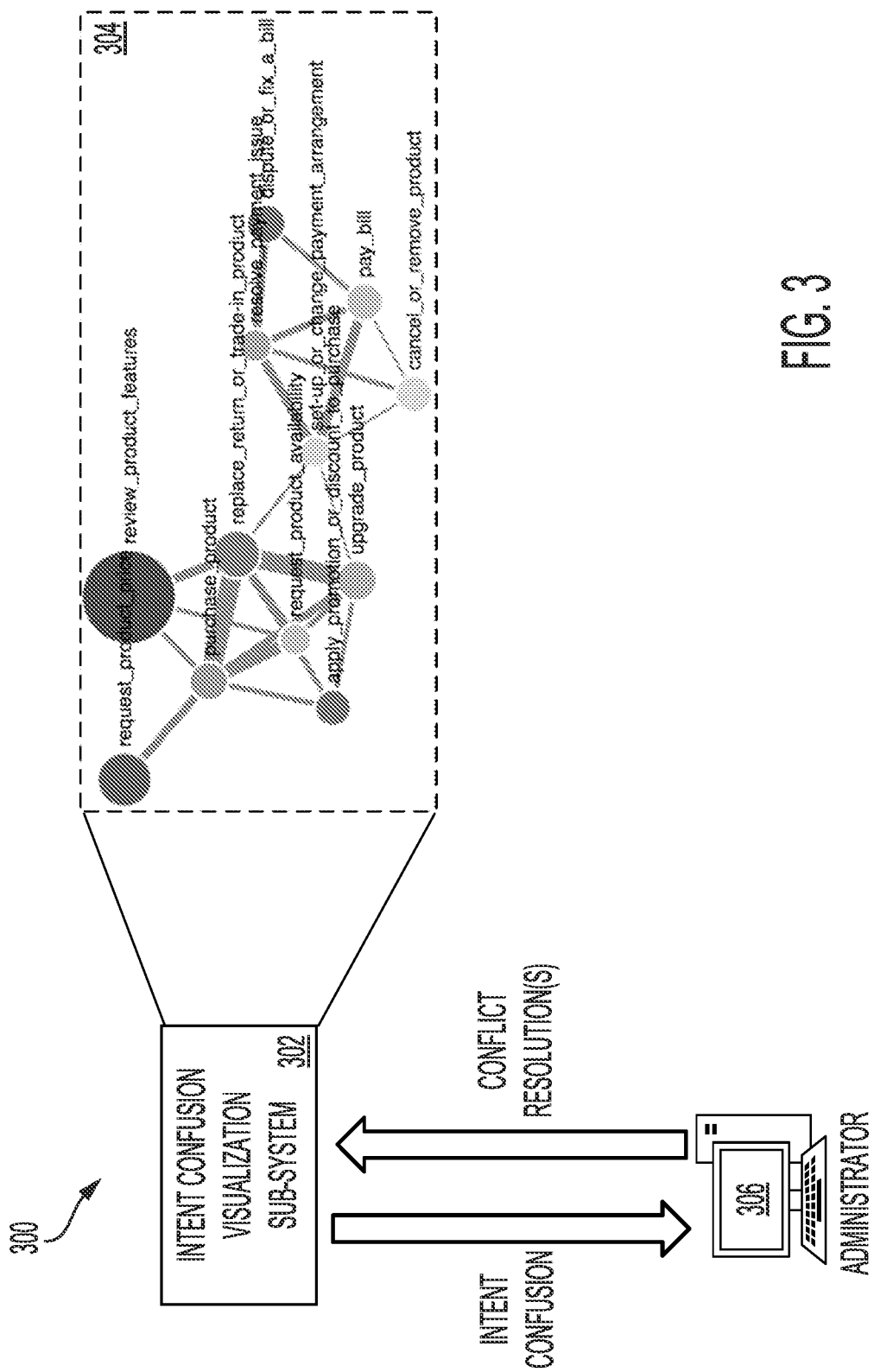
FIG. 3 shows an illustrative example of an environment in which an intent confusion visualization sub-system generates a graphical representation of taxonomic ambiguity for various conversations in accordance with at least one embodiment.

FIG. 3 shows an illustrative example of an environment 300 in which an intent confusion visualization sub-system 302 generates a graphical representation 304 of taxonomic ambiguity for various conversations in accordance with at least one embodiment. As noted above, the intent confusion visualization sub-system 302 can generate, via an interface (e.g., GUI), a graphical representation 304 of various intents and the level of confusion amongst different pairings of intents. For instance, the intent confusion visualization sub-system 302 may generate the graphical representation 304 in response to an indication from the intent classification sub-system that it has completed generating metrics for different annotations and annotation pairings for a set of conversations. The indication from the intent classification sub-system may include an identifier corresponding to an entry that incorporates the metrics calculated by the intent classification sub-system for the set of conversations. Thus, in response to the indication, the intent confusion visualization sub-system 302 may access the entry to obtain the requisite data (e.g., set of metrics corresponding to annotations for a set of conversations, etc.) needed to generate the graphical representation 304 of the level of confusion amongst annotators and/or the machine learning algorithm used by the intent discovery sub-system in its annotation of messages corresponding to the set of conversations.

As noted above, the intent confusion visualization sub-system 302 may generate the graphical representation 304 in response to a request from an administrator 306 or expert annotator to generate the graphical representation 304 for a set of conversations. For instance, an administrator 306 or expert annotator, via an interface (e.g., GUI) provided by the intent confusion visualization sub-system 302 or the customer service call center, may submit a request for generation of the graphical representation 304 for a set of conversations. Through the interface, the administrator 306 or expert annotator may specify which conversations are to be evaluated for generation of the graphical representation 304. For example, when an administrator 306 or expert annotator accesses the intent confusion visualization sub-system 302 to request a graphical representation 304 illustrating the level of confusion amongst annotators and/or the machine learning algorithm used by an intent discovery sub-system, as described above, the intent confusion visualization sub-system 302 may identify which messages and conversations that the administrator 306 or expert annotator may have access to. For instance, if an administrator 306 or expert annotator is authorized to evaluate conversations corresponding to a particular brand, the intent confusion visualization sub-system 302 may allow the administrator 306 or expert annotator to select a set of conversations associated with the particular brand.

In an embodiment, the intent confusion visualization sub-system 302 can provide, to the administrator 306 or expert annotator via the interface, a listing of the various intents or classifications identified by annotators and/or the machine learning algorithm used by the intent discovery sub-system for different conversations. This may allow the administrator 306 or expert annotator to select particular intents or classifications for which the administrator 306 or expert would like to evaluate and determine the level of confusion between the selected intents or classifications and other intents or classifications for applicable conversations. In some instances, an administrator 306 or expert annotator, via the interface, may define any thresholds that may be used by the intent confusion visualization sub-system 302 to define the size of the nodes and of the edges within the graphical representation 304. For instance, an administrator 306 or expert annotator may define a minimum level of confusion threshold value that may be used to determine whether to generate an edge between two nodes corresponding to distinct intents or classifications. Similarly, an administrator 306 or expert annotation may define a minimum frequency threshold value that may be used to determine whether to generate a node corresponding to an intent or classification. For instance, if a particular intent or classification is selected a number of times below the minimum frequency threshold value, the intent confusion visualization sub-system 302 may forego generating a node for the particular intent or classification.

Based on the set of conversations and/or intents or classifications selected by the administrator 306 or expert annotator, the intent confusion visualization sub-system 302 may generate the graphical representation 304 of the level of confusion amongst annotators and/or the machine learning algorithm used by the intent discovery sub-system. As noted above, the intent confusion visualization sub-system 302 may define a node corresponding to each intent or classification identified by annotators and/or the machine learning algorithm used by the intent discovery sub-system for the set of conversations or messages selected by the administrator 306 or expert annotator. The size of each node represented in the graphical representation 304 may be determined based on the frequency of annotators and/or the machine learning algorithm applying this intent or classification to messages associated with the selected set of conversations being evaluated. For instance, a node corresponding to an intent or classification that is frequently selected by annotators and/or by the machine learning algorithm may have a larger size compared to a node corresponding to an intent or classification that is less frequently selected by annotators and/or the machine learning algorithm.

In some instances, the intent confusion visualization sub-system 302 may utilize an algorithm to determine the size of each node corresponding to a particular intent or classification, as well as to determine the color and/or shape of each node. For instance, nodes may be assigned a particular set of colors according to the intent or classification type or category of the underlying intents or classifications. For example, intents or classifications corresponding to product characteristics and reviews may be assigned a particular color range (with corresponding shades), whereas intents or classifications corresponding to payments may be assigned a different color range (with corresponding shades). This may allow the administrator 306 or expert annotator to immediately determine, from the graphical representation 304, any annotator confusion amongst different types of intents or classifications.

In addition to defining and presenting, in the graphical representation 304, nodes corresponding to different intents or classifications for a selected set of conversations or messages, the intent confusion visualization sub-system 302 may generate an edge between two nodes for which a level of confusion between the corresponding intents or classifications has been detected. The size of each edge represented in the graphical representation 304 may be determined based on the level of confusion corresponding to the selection of the intents or classifications associated with the two nodes for which an edge is being generated. For instance, if there is a significant level of confusion between a pair of intents or classifications, the intent confusion visualization sub-system 302 may generate an edge between the nodes corresponding to the pair of intents or classifications that has a greater thickness. Alternatively, if there is a minimal level of confusion between a pair of intents or classifications, the intent confusion visualization sub-system 302 may generate an edge between the nodes corresponding to the pair of intents of classifications that has a lesser thickness. In an embodiment, the intent confusion visualization sub-system 302 utilizes an algorithm to determine a minimum level of confusion required for defining an edge between two nodes associated with a pair of intents or classifications. In some instances, an edge between two nodes may be generated if the level of confusion between the pair of intents or classifications associated with these two nodes satisfies a level of confusion threshold. For instance, using a metric calculated using Eq. 1 above, the intent confusion visualization sub-system 302 may determine whether the metric exceeds the a minimum level of confusion threshold value. If so, the intent confusion visualization sub-system 302 may define an edge between the two nodes corresponding to this pair of intents or classifications. As noted above, the administrator 306 or expert annotator may define, via the interface, a minimum level of confusion threshold value that may be used to determine whether to generate an edge between two nodes corresponding to distinct intents or classifications. Based on this minimum level of confusion threshold value, the intent confusion visualization sub-system 302 may determine whether to generate and present an edge between a pair of nodes corresponding to intents or classifications selected by annotators and/or the machine learning algorithm.

Once the intent confusion visualization sub-system 302 has determined which nodes and edges to present for corresponding intents or classifications associated with a set of conversations, the intent confusion visualization sub-system 302 may generate the graphical representation 304. The graphical representation 304 may be provided via the interface or through a portal provided by the customer service call center and accessible via a computing device utilized by an administrator 306 or expert annotator. The graphical representation 304 may include the various nodes corresponding to the different intents or classifications selected or otherwise identified by annotators and/or the machine learning algorithm, as well as any edges between these various nodes, which may graphically represent the level of confusion amongst annotators and/or the machine learning algorithm between different nodes. In some instances, in addition to providing the aforementioned graphical representation 304 of the level of confusion amongst annotators and/or the machine learning algorithm for different pairings of intents or classifications, the intent confusion visualization sub-system 302 may provide insights that may be used by the administrator 306 or expert annotator in addressing confusion amongst annotators and/or the machine learning algorithm.

Through the graphical representation 304, the administrator 306 or expert annotator may interact with a particular node to obtain additional information with regard to the corresponding intent or classification and to the level of confusion between the intent or classification and other intents or classifications, as represented using edges between the particular node and other nodes corresponding to these other intents or classifications. For instance, if the administrator 306 or expert annotator selects a particular node from the graphical representation 304, the intent confusion visualization sub-system 302 may highlight the selected node and any edges and other nodes associated with the selected node. For example, if an edge has been defined between the selected node and another node, the intent confusion visualization sub-system 302 may highlight the selected node, the other node, and the edge connecting the selected node and the other node. In some instances, in addition to highlighting the selected node, the other node, and the edge connecting the selected node and the other node, the intent confusion visualization sub-system 302 may hide or otherwise obscure (e.g., dim, make translucent, etc.) any nodes and/or edges that are not associated with the selected node. Thus, the intent confusion visualization sub-system 302 may focus on the selected node and associated edges and other nodes, which may allow the administrator 306 or expert annotator to better visualize the level of confusion between the intent or classification associated with the selected node and any other intents or classifications associated with the other highlighted nodes.

In addition to highlighting the selected node and any associated nodes and edges, the intent confusion visualization sub-system 302 may provide, via the graphical representation 304 and in response to selection of a node, metrics associated with the intent or classification associated with the selected node. For instance, the intent confusion visualization sub-system 302 may present, via the graphical representation 304, the number of messages of the set of conversations for which there may have been confusion amongst annotators and/or the machine learning algorithm between the selected intent or classification and another intent or classification, as represented through the graphical representation 304 using an edge connecting the selected node and another node associated with the other intent or classification. Through the graphical representation 304, the administrator 306 or expert annotator may access any of these messages to determine the context of these messages and determine the correct intent or classification for each of these messages. Further, by evaluating these messages, the administrator 306 or expert annotator may determine possible causes for confusion amongst annotators and/or the machine learning algorithm.

In an embodiment, when an administrator 306 or expert annotator selects a particular node from the graphical representation 304, the intent confusion visualization sub-system 302 can provide the administrator 306 or expert annotator with an option to reclassify the particular intent or classification associated with the node. For instance, in response to an administrator 306 or expert annotator selecting a particular node, the intent confusion visualization sub-system 302 may update the graphical representation 304 to present a listing of intents or classifications that may be available to the administrator 306 or expert annotator for reclassifying the node and any corresponding annotations. The listing of intents or classifications may specify the various intents or classifications that may be available to annotators and/or to the machine learning algorithm for annotating messages communicated between a customer and an agent. The intents or classifications provided in the listing may be associated with a particular brand or other agent grouping (e.g., agents corresponding to a particular organizational unit of a brand, etc.). Thus, the administrator 306 or expert annotator may readily identify which intents or classifications are available to annotators and/or the machine learning algorithm and select an appropriate intent or classification for the particular node.

In an embodiment, the intent confusion visualization sub-system 302 can further provide an administrator 306 or expert annotator with an option to create a new intent or classification to replace an existing intent or classification associated with a selected node. For instance, if the administrator 306 or expert annotator selects a particular node from the graphical representation 304, the intent confusion visualization sub-system 302, in addition to providing the listing of available intents or classifications, may provide the administrator 306 or expert annotator with an option to generate a new intent or classification that may be assigned to the node and to the corresponding annotations previously made by the annotators and/or machine learning algorithm. If the administrator 306 or expert annotator generates a new intent or classification for the selected node, the intent confusion visualization sub-system 302 may assign the new intent or classification to the particular node and update the listing of the various intents or classifications available to annotators and to the machine learning algorithm to incorporate the newly generated intent or classification.

Through the graphical representation 304, the intent confusion visualization sub-system 302 may also allow the administrator 306 or expert annotator to consolidate two or more nodes by assigned a single intent or classification to these two or more nodes. For instance, an administrator 306 or expert annotator may select two or more nodes from the graphical representation 304 and assign a particular intent or classification to the selected two or more nodes. Alternatively, the administrator 306 or expert annotator may select a particular node and assign an intent or classification to this particular node that is also assigned to another node, resulting in a pair of nodes being associated with the same intent or classification.

As noted above, if an administrator 306 or expert annotator updates one or more nodes within the graphical representation 304 such that two or more nodes are associated with the same intent or classification, the intent confusion visualization sub-system 302 may, dynamically and in real-time, update the graphical representation 304 to provide a new level of confusion amongst annotators and/or the intent discovery sub-system for the different pairings of intents or classifications. For instance, in response to an update provided by an administrator 306 or expert annotator, the intent confusion visualization sub-system 302 may transmit information corresponding to the update to an intent classification sub-system, which may update the entries corresponding to the messages that may have been previously annotated with the intents or classifications being replaced by the new intent or classification selected by the administrator 306 or expert annotator to include new annotations corresponding to the new intent or classification. The intent classification sub-system may update the entries corresponding to the set of conversations impacted by this update to incorporate the updated annotations.

Once the entries corresponding to the set of conversations impacted by the administrator or expert annotator's update to the one or more nodes have been updated, the conversation data corresponding to these conversations can be re-evaluated to determine a new level of confusion amongst annotators and/or the machine learning algorithm corresponding to the updated annotations. Based on this new level of confusion, the intent confusion visualization sub-system 302 may dynamically, and in real-time, update the graphical representation 304 of the level of confusion amongst annotators and/or the machine learning algorithm in their annotation of messages corresponding to the set of conversations. For instance, the intent confusion visualization sub-system 302 may update the graphical representation 304 to include nodes corresponding to the selected intent or classification provided by the administrator or expert annotator and any other unchanged intents or classifications, as annotated by the annotators or provided by the machine learning algorithm.

As noted above, the intent confusion visualization sub-system 302 may determine the size of each node represented in the updated graphical representation based on the frequency of the corresponding intent or classification to messages associated with the set of conversations. Thus, the size and number of nodes within the graphical representation 304 may dynamically, and in real-time, change in response to the updates to one or more nodes within the graphical representation 304 provided by an administrator 306 or expert annotator to associate these one or more nodes with new or alternative intents or classifications. In addition to updating the nodes within the graphical representation 304 in response to a change in the intent or classification of one or more nodes, the intent confusion visualization sub-system 302 may further update the edges between the updated nodes to represent the level of confusion between each pairing of nodes for which a level of confusion has been detected. The intent confusion visualization sub-system 302 may determine the size of each edge based on the level of confusion corresponding to the selection of the intents or classifications associated with the two nodes in a pairing, as described above. Thus, in response to an update to the intent or classification for a particular node, the intent confusion visualization sub-system 302 may dynamically and in real-time update the graphical representation 304 to provide updated insights into the level of confusion that may occur as a result of a change (e.g., consolidation, re-labeling, etc.) to one or more intents or classifications.

Figure 4:
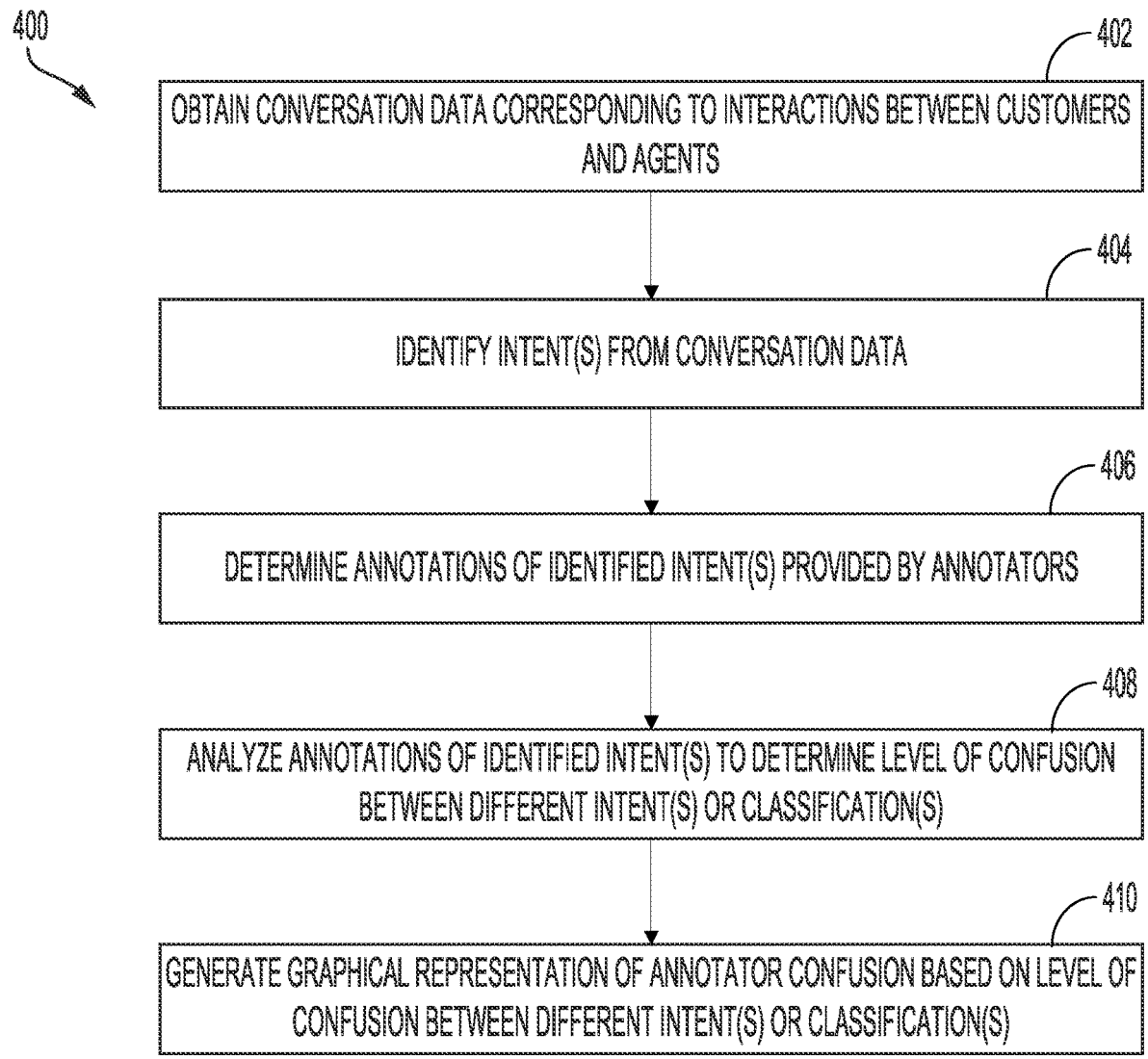
FIG. 4 shows an illustrative example of a process for determining the level of intent confusion between different intent classifications for identified intents in accordance with at least one embodiment.

FIG. 4 shows an illustrative example of a process 400 for determining the level of intent confusion between different intent classifications for identified intents in accordance with at least one embodiment. The process 400 may be performed by an intent confusion evaluation engine of a customer service call center. In an embodiment, the intent confusion evaluation engine can perform the process 400 periodically (e.g., daily, weekly, monthly, etc.) or in response to a triggering event. As noted above, the intent confusion evaluation engine may periodically transmit an instruction or other request to the annotators to annotate a set of conversations stored in a conversation data store. Alternatively, the intent confusion evaluation engine may transmit an instruction or other request to the annotators in response to a request from an administrator or expert annotator to obtain annotations from the annotators in order to determine the level of confusion (if any) amongst the annotators for a variety of intents or classifications. In some instances, the intent confusion evaluation engine may prompt annotators to annotate conversations from the conversation data store once a threshold number of conversations have been recorded and stored in the conversation data store. Additionally, or alternatively, the intent confusion evaluation engine can prompt the annotators to annotate a particular conversation in response to a negative customer interaction with an agent or conversational bot agent during the particular conversation. As another example, the intent confusion evaluation engine can prompt the annotators to annotate the particular example in response to the conversation being transferred to a human agent from a conversational bot agent. Once these annotations have been obtained, the intent confusion evaluation engine may execute the process 400.

At step 402, the intent confusion evaluation engine may obtain conversation data corresponding to interactions between customers and agents. For instance, the intent confusion evaluation engine may query the conversation data store to obtain entries corresponding to messages communicated between customers and agents over a period of time. As noted above, as annotators assign an intent or classification to each message, the entry in the conversation data store corresponding to a message may be updated to indicate the intents or classifications assigned to the message by the annotators. An entry corresponding to a particular message may indicate a number of different intents or classifications as determined by the annotators, as well as the frequency (e.g., level of agreement) of each intent or classification selected by the annotators for the particular message. In some instances, if the annotations are provided using a machine learning algorithm, an entry corresponding to a particular message may define a confidence score for each possible intent or classification that may be assigned to the message. For instance, for a particular message, the classification model may identify a number of possible intents or classifications for the message and a corresponding confidence score for each of these possible intents or classifications identified by the classification model for the particular message.

At step 404, the intent confusion evaluation engine may identify one or more intents from the conversation data. The intent confusion evaluation engine may evaluate the conversation data to determine the organization structure of the conversation data. For instance, the intent confusion evaluation engine may determine whether the conversation data corresponds to conversations for a particular brand, for a particular organizational unit associated with a brand, for particular type(s) of intents (e.g., sales, technical support, billing, etc.), and the like. The intent confusion evaluation engine may determine, from the conversation data store, what intents or classifications are available to annotators and/or the machine learning algorithm utilized by the intent discovery sub-system (as described above) for annotation of messages based on the organization structure used for tracking conversations between customers and agents. For instance, if messages corresponding to conversations between customers and agents are organized according to a brand, the intent confusion evaluation engine may identify the intents or classifications corresponding to the brand that are made available to the annotators and/or the machine learning algorithm associated with the brand.

At step 406, the intent confusion evaluation engine determines what annotations have been provided by the annotators and/or the machine learning algorithm corresponding to the identified intents. As noted above, as annotators assign an intent or classification to each message, an entry corresponding to the message may be updated to indicate the intents or classifications assigned to the message by the annotators. An entry corresponding to a particular message may indicate a number of different intents or classifications as determined by the annotators, as well as the frequency (e.g., level of agreement) of each intent or classification selected by the annotators for the particular message. For example, if a set of ten annotators are tasked with assigning an intent or classification to a particular message, an entry corresponding to the message may specify each of the ten annotations generated by the ten annotators assigning an intent or classification to the message. In some instances, if the intent confusion evaluation engine, via an intent discovery sub-system, utilizes a machine learning algorithm to annotate each message, the intent confusion evaluation engine may obtain a number of possible intents or classifications for the message and a corresponding confidence score for each of these possible intents or classifications identified by the machine learning algorithm for each message.

At step 408, the intent confusion evaluation engine may analyze the annotations of the identified intents for the set of conversations to determine the level of confusion amongst the annotators and/or the machine learning algorithm between different intents or classifications. The intent confusion evaluation engine may implement an aggregation strategy to determine the level of confusion amongst annotators and/or the machine learning algorithm utilized by the intent discovery sub-system for different intent or classification pairings. For instance, the intent confusion evaluation engine may compute the frequency in which a particular intent or classification is selected for the various messages corresponding to the set of conversations. In an embodiment, the intent confusion evaluation engine can store the intents or classifications identified by the annotators and/or the intent discovery sub-system, as well as any metrics corresponding to the level of confusion amongst the annotators and/or the machine learning algorithm utilized by the intent discovery sub-system, as described herein.

Additionally, the intent confusion evaluation engine may calculate, or otherwise determine, a metric corresponding to the level of confusion detected amongst a set of annotators and/or the machine learning algorithm. For instance, the intent confusion evaluation engine may, for each message and for each intent or classification pairing, determine the average number of times that an annotator (e.g., human annotator and/or the machine learning algorithm) selected or scored a particular intent or classification over a different intent or classification selected by another annotator for the message. An example of a metric that may be calculated to denote the level of confusion between annotators and/or the intent discovery sub-system for a pair of intents is described above in connection with Eq. 1.

At step 410, the intent confusion evaluation engine may generate a graphical representation of annotator confusion based on the level of confusion between different intents or classifications. The graphical representation of annotator confusion may include a set of nodes, wherein each node may correspond to a particular intent or classification. In an embodiment, the intent confusion evaluation engine can determine the size of each node represented in the graphical representation based on the frequency of annotators applying this intent or classification to messages associated with the set of conversations being evaluated. In some instances, the intent confusion evaluation engine may utilize an algorithm to determine the size of each node corresponding to a particular intent or classification, as well as to determine the color and/or shape of each node. For instance, nodes may be assigned a particular set of colors according to the intent or classification type or category of the underlying intents or classifications.

The intent confusion evaluation engine may further generate an edge between a pair of nodes for which a level of confusion between corresponding intents or classifications has been detected. The intent confusion evaluation engine may determine the size of an edge between two nodes based on the level of confusion corresponding to the selection of the intents or classifications associated with the two nodes. The intent confusion evaluation engine may use an algorithm to determine a minimum level of confusion required for defining an edge between two nodes associated with a pair of intents or classifications. In some instances, an edge between two nodes may be generated if the level of confusion between the pair of intents or classifications associated with these two nodes satisfies a level of confusion threshold. For instance, using a metric calculated using Eq. 1 above, the intent confusion evaluation engine may determine whether the metric exceeds the a minimum level of confusion threshold value. If so, the intent confusion evaluation engine may define an edge between the two nodes corresponding to this pair of intents or classifications.

The intent confusion evaluation engine may update an interface utilized by an administrator or expert annotator, such as a GUI, to present the graphical representation of annotator confusion for different intents or classifications. The graphical representation may include the various nodes corresponding to the different intents or classifications selected by annotators and/or identified by the intent discovery sub-system, as well as any edges between these various nodes, which may graphically represent the level of confusion amongst annotators and/or the intent discovery sub-system between different nodes. In some instances, in addition to providing the aforementioned graphical representation of the level of confusion for different pairings of intents or classifications, the intent confusion evaluation engine may provide insights that may be used by an administrator or expert annotator in addressing confusion amongst annotators and/or the intent discovery sub-system, as described above.

Figure 5:
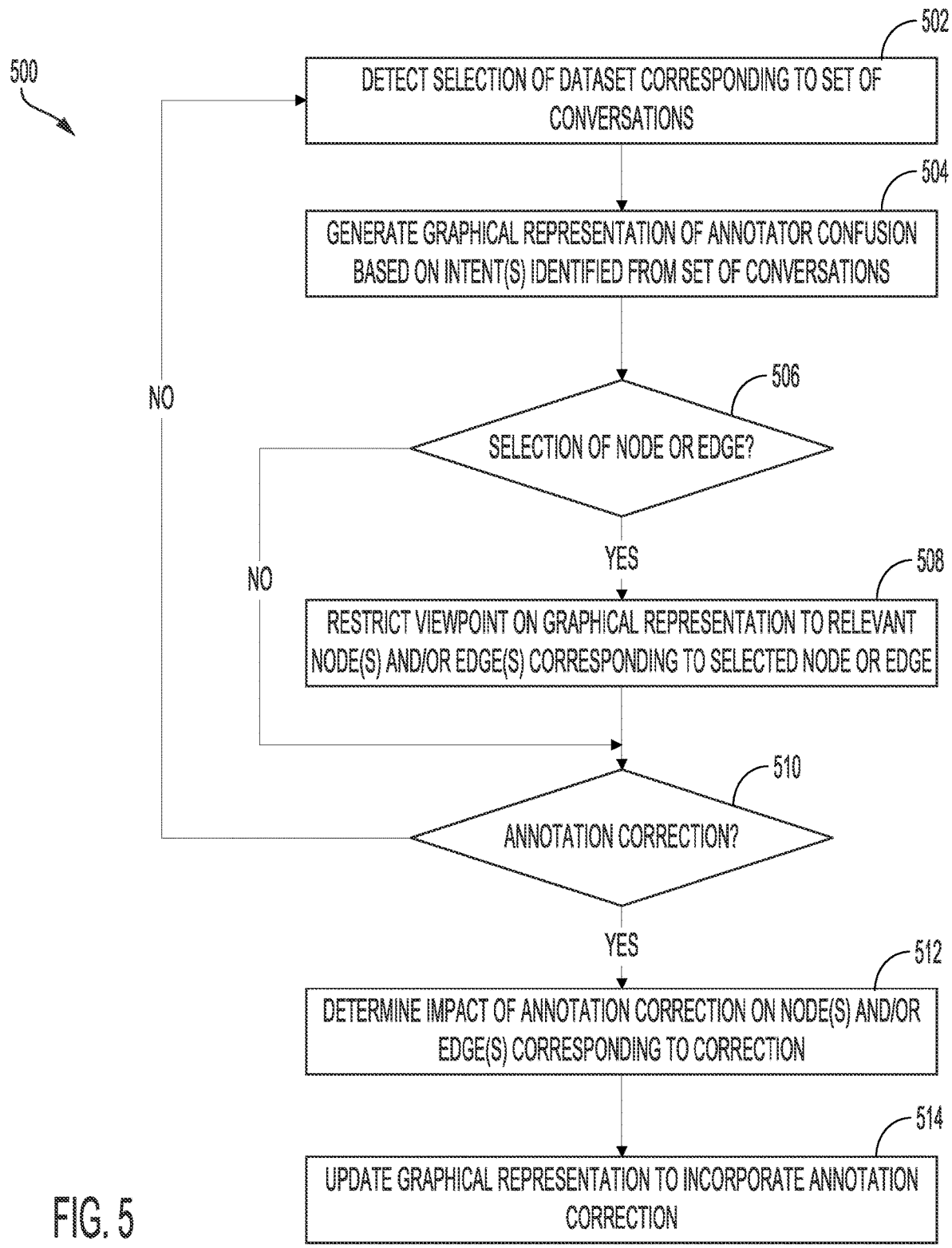
FIG. 5 shows an illustrative example of a process for determining impact of annotation corrections on edges and/or nodes corresponding to corrections in accordance with at least one embodiment.

FIG. 5 shows an illustrative example of a process 500 for determining the impact of annotation corrections on edges and/or nodes corresponding to corrections in accordance with at least one embodiment. The process 500 may be performed by the aforementioned intent confusion evaluation engine of a customer service call center. As noted above, the intent confusion evaluation engine may generate a graphical representation of the level of confusion amongst annotators and/or a machine learning algorithm for a set of conversations in response to a request from an administrator or expert annotator to generate the graphical representation for the set of conversations. For instance, an administrator or expert annotator, via an interface (e.g., GUI) provided by the intent confusion evaluation engine, may submit a request for generation of the graphical representation for a set of conversations. Through the interface, the administrator or expert annotator may specify which conversations are to be evaluated for generation of the graphical representation. For example, when an administrator or expert annotator accesses the intent confusion evaluation engine to request a graphical representation illustrating the level of confusion amongst annotators and/or the machine learning algorithm, as described above, the intent confusion evaluation engine may identify which messages and conversations that the administrator or expert annotator may have access to. For instance, if an administrator or expert annotator is authorized to evaluate conversations corresponding to a particular brand, the intent confusion evaluation engine may allow the administrator or expert annotator to select a set of conversations associated with the particular brand.

At step 502, the intent confusion evaluation engine may detect selection of a dataset corresponding to a set of conversations. For instance, if the administrator or expert annotator selects one or more conversations from conversations associated with a particular brand, the intent confusion evaluation engine may obtain, from a conversation data store, entries corresponding to annotated messages associated with the selected one or more conversations. As noted above, an entry corresponding to a particular message may indicate a number of different intents or classifications as determined by the annotators, as well as the frequency (e.g., level of agreement) of each intent or classification selected by the annotators for the particular message. Further, for the selected dataset (e.g., set of conversations, etc.), the intent confusion evaluation engine may maintain metrics corresponding to the level of confusion corresponding to different intent or classification pairings. An example of a metric that may be calculated to denote the level of confusion between annotators and/or the intent discovery sub-system for a pair of intents is described above in connection with Eq. 1.

At step 504, the intent confusion evaluation engine may generate a graphical representation of annotator confusion based on the set of intents or classifications identified from the set of conversations. The intent confusion evaluation engine may execute the process 400 described above in connection with FIG. 4 to generate this graphical representation of annotator confusion. For instance, the intent confusion evaluation engine may obtain the conversation data corresponding to dataset selected by the administrator or expert annotator and process this conversation data to identify available intents or classifications and the annotations made by annotators and/or the machine learning algorithms to the various messages corresponding to the set of conversations of the dataset. The intent confusion evaluation engine may analyze these annotations to determine the level of confusion between different intents or classifications. Based on the level of confusion between these different intents or classifications, the intent confusion evaluation engine may generate the graphical representation of annotator confusion.

At step 506, the intent confusion evaluation engine may determine whether an administrator or expert annotator has selected a particular node or edge from the graphical representation of annotator confusion. As noted above, through the graphical representation, an administrator or expert annotator may interact with a particular node to obtain additional information with regard to the corresponding intent or classification and to the level of confusion between the intent or classification and other intents or classifications, as represented using edges between the particular node and other nodes corresponding to these other intents or classifications. Similarly, an administrator or expert annotator may interact with a particular edge to obtain additional information regarding the level of confusion between the intents or classifications corresponding to the two nodes connected to either end of the selected edge.

If the intent confusion evaluation engine determines that an administrator or expert has selected a particular node or edge from the graphical representation, the intent confusion evaluation engine, at step 508, may restrict the viewpoint on the graphical representation to focus on the relevant nodes and/or edges corresponding to the selected node or edge. For instance, the intent confusion evaluation engine may highlight the selected node and any edges and other nodes associated with the selected node. For example, if an edge has been defined between the selected node and another node, the intent confusion evaluation engine may highlight the selected node, the other node, and the edge connecting the selected node and the other node. In some instances, in addition to highlighting the selected node, the other node, and the edge connecting the selected node and the other node, the intent confusion evaluation engine may hide or otherwise obscure (e.g., dim, make translucent, etc.) any nodes and/or edges that are not associated with the selected node. Thus, the intent confusion evaluation engine may focus on the selected node and associated edges and other nodes, which may allow the administrator or expert annotator to better visualize the level of confusion between the intent or classification associated with the selected node and any other intents or classifications associated with the other highlighted nodes.

In an embodiment, in addition to highlighting the selected node and any associated nodes and edges, the intent confusion evaluation engine may provide, via the graphical representation and in response to selection of a node or edge, metrics associated with the intent or classification associated with the selected node or edge. For instance, intent confusion evaluation engine may present, via the graphical representation, the number of messages of the set of conversations for which there may have been confusion amongst annotators and/or the machine learning algorithm between the selected intent or classification and another intent or classification, as represented through the graphical representation using an edge connecting the selected node and another node associated with the other intent or classification. Through the graphical representation, the administrator or expert annotator may access any of these messages to determine the context of these messages and determine the correct intent or classification for each of these messages. Further, by evaluating these messages, the administrator or expert annotator may determine possible causes for confusion amongst annotators and/or the machine learning algorithm.

As noted above, when an administrator or expert annotator selects a particular node or edge from the graphical representation, the intent confusion evaluation engine may provide the administrator or expert annotator with an option to reclassify the particular intent or classification associated with the node. For instance, in response to an administrator or expert annotator selecting a particular node, the intent confusion evaluation engine may update the graphical representation to present a listing of intents or classifications that may be available to the administrator or expert annotator for reclassifying the node and any corresponding annotations. The listing of intents or classifications may specify the various intents or classifications that may be available to annotators and/or to the machine learning algorithm for annotating messages communicated between a customer and an agent. The intents or classifications provided in the listing may be associated with a particular brand or other agent grouping (e.g., agents corresponding to a particular organizational unit of a brand, etc.). Thus, the administrator or expert annotator may readily identify which intents or classifications are available to annotators and/or the machine learning algorithm and select an appropriate intent or classification for the particular node. Further, the intent confusion evaluation engine may provide an administrator or expert annotator with an option to create a new intent or classification to replace an existing intent or classification associated with a selected node. For instance, if the administrator or expert annotator selects a particular node from the graphical representation, the intent confusion evaluation engine may provide the administrator or expert annotator with an option to generate a new intent or classification that may be assigned to the node and to the corresponding annotations.

At step 510, the intent confusion evaluation engine may determine whether the administrator or expert annotator has made an annotation correction via the graphical representation. For instance, the intent confusion evaluation engine may detect when an administrator or expert annotator has assigned a new or alternative intent or classification to a particular node within the graphical representation. As another example, the intent confusion evaluation engine may detect a request from an administrator or expert annotator to consolidate a set of nodes into a single node, whereby the corresponding intents or classifications may be aggregated into a single intent or classification. For instance, an administrator or expert annotator may select two or more nodes from the graphical representation and assign a particular intent or classification to the selected two or more nodes. Alternatively, the administrator or expert annotator may select a particular node and assign an intent or classification to this particular node that is also assigned to another node, resulting in a pair of nodes being associated with the same intent or classification.

If the intent confusion evaluation engine determines that the administrator or expert annotator has made an annotation correction via the graphical representation, the intent confusion evaluation engine, at step 512, may determine the impact of the annotation correction on the affected nodes and/or edges corresponding to the annotation correction. For instance, in response to an update provided by an administrator or expert annotator, the intent confusion evaluation engine may update the entries corresponding to the messages that may have been previously annotated with the intents or classifications being replaced by the new intent or classification selected by the administrator or expert annotator to include new annotations corresponding to the new intent or classification. The intent confusion evaluation engine may update the entries corresponding to the set of conversations impacted by this update to incorporate the updated annotations. Further, the intent confusion evaluation engine may re-evaluate the conversation data corresponding to these conversations to determine a new level of confusion amongst annotators and/or the machine learning algorithm corresponding to the updated annotations. This re-evaluation may be performed via the processes described above for determining the level of confusion amongst annotators and/or the machine learning algorithm for different intents or classifications.

At step 514, the intent confusion evaluation engine may update the graphical representation to incorporate the annotation correction submitted by the administrator or expert annotator. For instance, based on the new level of confusion amongst the different intents or classifications, as determined by the intent confusion evaluation engine in response to the annotation correction, the intent confusion evaluation engine may dynamically, and in real-time, update the graphical representation of the level of confusion amongst annotators and/or the machine learning algorithm in their annotation of messages corresponding to the set of conversations. The intent confusion evaluation engine may update the graphical representation to include nodes corresponding to the selected intent or classification provided by the administrator or expert annotator and any other unchanged intents or classifications, as annotated by the annotators or provided by the machine learning algorithm. Further, the size and number of nodes within the graphical representation may dynamically, and in real-time, change in response to the updates to one or more nodes within the graphical representation provided by an administrator or expert annotator to associate these one or more nodes with new or alternative intents or classifications. In addition to updating the nodes within the graphical representation in response to a change in the intent or classification of one or more nodes, the intent confusion evaluation engine may update the edges between the updated nodes to represent the level of confusion between each pairing of nodes for which a level of confusion has been detected. The intent confusion evaluation engine may determine the size of each edge based on the level of confusion corresponding to the selection of the intents or classifications associated with the two nodes in a pairing, as described above.

Figure 6:
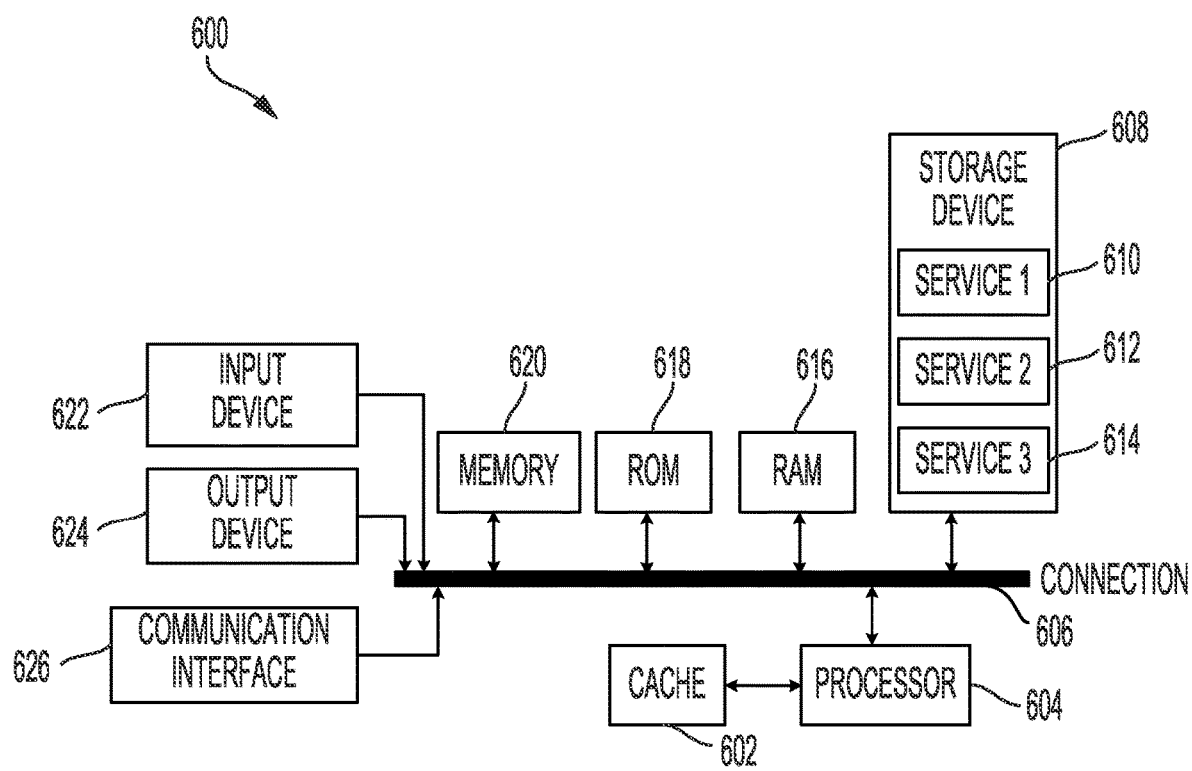
FIG. 6 shows an illustrative example of an environment in which various embodiments can be implemented.

FIG. 6 illustrates a computing system architecture 600 including various components in electrical communication with each other using a connection 606, such as a bus, in accordance with some implementations. Example system architecture 600 includes a processing unit (CPU or processor) 604 and a system connection 606 that couples various system components including the system memory 620, such as ROM 618 and RAM 616, to the processor 604. The system architecture 600 can include a cache 602 of high-speed memory connected directly with, in close proximity to, or integrated as part of the processor 604. The system architecture 600 can copy data from the memory 620 and/or the storage device 608 to the cache 602 for quick access by the processor 604. In this way, the cache can provide a performance boost that avoids processor 604 delays while waiting for data. These and other modules can control or be configured to control the processor 604 to perform various actions.

Other system memory 620 may be available for use as well. The memory 620 can include multiple different types of memory with different performance characteristics. The processor 604 can include any general purpose processor and a hardware or software service, such as service 1 610, service 2 612, and service 3 614 stored in storage device 608, configured to control the processor 604 as well as a special-purpose processor where software instructions are incorporated into the actual processor design. The processor 604 may be a completely self-contained computing system, containing multiple cores or processors, a bus, memory controller, cache, etc. A multi-core processor may be symmetric or asymmetric.

To enable user interaction with the computing system architecture 600, an input device 622 can represent any number of input mechanisms, such as a microphone for speech, a touch-sensitive screen for gesture or graphical input, keyboard, mouse, motion input, speech and so forth. An output device 624 can also be one or more of a number of output mechanisms known to those of skill in the art. In some instances, multimodal systems can enable a user to provide multiple types of input to communicate with the computing system architecture 600. The communications interface 626 can generally govern and manage the user input and system output. There is no restriction on operating on any particular hardware arrangement and therefore the basic features here may easily be substituted for improved hardware or firmware arrangements as they are developed.

Storage device 608 is a non-volatile memory and can be a hard disk or other types of computer readable media which can store data that are accessible by a computer, such as magnetic cassettes, flash memory cards, solid state memory devices, digital versatile disks, cartridges, RAMs 616, ROM 618, and hybrids thereof.

The storage device 608 can include services 610, 612, 614 for controlling the processor 604. Other hardware or software modules are contemplated. The storage device 608 can be connected to the system connection 606. In one aspect, a hardware module that performs a particular function can include the software component stored in a computer-readable medium in connection with the necessary hardware components, such as the processor 604, connection 606, output device 624, and so forth, to carry out the function.

The disclosed methods can be performed using a computing system. An example computing system can include a processor (e.g., a central processing unit), memory, non-volatile memory, and an interface device. The memory may store data and/or and one or more code sets, software, scripts, etc. The components of the computer system can be coupled together via a bus or through some other known or convenient device. The processor may be configured to carry out all or part of methods described herein for example by executing code for example stored in memory. One or more of a user device or computer, a provider server or system, or a suspended database update system may include the components of the computing system or variations on such a system.

This disclosure contemplates the computer system taking any suitable physical form, including, but not limited to a Point-of-Sale system ("POS"). As example and not by way of limitation, the computer system may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, the computer system may include one or more computer systems; be unitary or distributed; span multiple locations; span multiple machines; and/or reside in a cloud, which may include one or more cloud components in one or more networks. Where appropriate, one or more computer systems may perform without substantial spatial or temporal limitation one or more steps of one or more methods described or illustrated herein. As an example and not by way of limitation, one or more computer systems may perform in real time or in batch mode one or more steps of one or more methods described or illustrated herein. One or more computer systems may perform at different times or at different locations one or more steps of one or more methods described or illustrated herein, where appropriate.

The processor may be, for example, be a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory can be coupled to the processor by, for example, a bus. The memory can include, by way of example but not limitation, random access memory (RAM), such as dynamic RAM (DRAM) and static RAM (SRAM). The memory can be local, remote, or distributed.

The bus can also couple the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software can be stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory herein. Even when software is moved to the memory for execution, the processor can make use of hardware registers to store values associated with the software, and local cache that, ideally, serves to speed up execution. As used herein, a software program is assumed to be stored at any known or convenient location (from non-volatile storage to hardware registers), when the software program is referred to as "implemented in a computer-readable medium." A processor is considered to be "configured to execute a program" when at least one value associated with the program is stored in a register readable by the processor.

The bus can also couple the processor to the network interface device. The interface can include one or more of a modem or network interface. It will be appreciated that a modem or network interface can be considered to be part of the computer system. The interface can include an analog modem, Integrated Services Digital network (ISDN0 modem, cable modem, token ring interface, satellite transmission interface (e.g., "direct PC"), or other interfaces for coupling a computer system to other computer systems. The interface can include one or more input and/or output (I/O) devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device.

In operation, the computer system can be controlled by operating system software that includes a file management system, such as a disk operating system. One example of operating system software with associated file management system software is the family of operating systems known as Windows® from Microsoft Corporation of Redmond, WA, and their associated file management systems. Another example of operating system software with its associated file management system software is the Linux™ operating system and its associated file management system. The file management system can be stored in the non-volatile memory and/or drive unit and can cause the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within registers and memories of the computer system into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some examples. The required structure for a variety of these systems will appear from the description below. In addition, the techniques are not described with reference to any particular programming language, and various examples may thus be implemented using a variety of programming languages.

In various implementations, the system operates as a standalone device or may be connected (e.g., networked) to other systems. In a networked deployment, the system may operate in the capacity of a server or a client system in a client-server network environment, or as a peer system in a peer-to-peer (or distributed) network environment.

The system may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any system capable of executing a set of instructions (sequential or otherwise) that specify actions to be taken by that system.

While the machine-readable medium or machine-readable storage medium is shown, by way of example, to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding, or carrying a set of instructions for execution by the system and that cause the system to perform any one or more of the methodologies or modules of disclosed herein.

In general, the routines executed to implement the implementations of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while examples have been described in the context of fully functioning computers and computer systems, those skilled in the art will appreciate that the various examples are capable of being distributed as a program object in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list of all examples in which a change in state for a binary one to a binary zero or vice-versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

The above description and drawings are illustrative and are not to be construed as limiting the subject matter to the precise forms disclosed. Persons skilled in the relevant art can appreciate that many modifications and variations are possible in light of the above disclosure. Numerous specific details are described to provide a thorough understanding of the disclosure. However, in certain instances, well-known or conventional details are not described in order to avoid obscuring the description.

As used herein, the terms "connected," "coupled," or any variant thereof when applying to modules of a system, means any connection or coupling, either direct or indirect, between two or more elements; the coupling of connection between the elements can be physical, logical, or any combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, or any combination of the items in the list.

Those of skill in the art will appreciate that the disclosed subject matter may be embodied in other forms and manners not shown below. It is understood that the use of relational terms, if any, such as first, second, top and bottom, and the like are used solely for distinguishing one entity or action from another, without necessarily requiring or implying any such actual relationship or order between such entities or actions.

While processes or blocks are presented in a given order, alternative implementations may perform routines having steps, or employ systems having blocks, in a different order, and some processes or blocks may be deleted, moved, added, subdivided, substituted, combined, and/or modified to provide alternative or sub combinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various examples described above can be combined to provide further examples.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further examples of the disclosure.

These and other changes can be made to the disclosure in light of the above Detailed Description. While the above description describes certain examples, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific implementations disclosed in the specification, unless the above Detailed Description section explicitly defines such terms. Accordingly, the actual scope of the disclosure encompasses not only the disclosed implementations, but also all equivalent ways of practicing or implementing the disclosure under the claims.

While certain aspects of the disclosure are presented below in certain claim forms, the inventors contemplate the various aspects of the disclosure in any number of claim forms. Any claims intended to be treated under 35 U.S.C. § 112(f) will begin with the words "means for". Accordingly, the applicant reserves the right to add additional claims after filing the application to pursue such additional claim forms for other aspects of the disclosure.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using capitalization, italics, and/or quotation marks. The use of highlighting has no influence on the scope and meaning of a term; the scope and meaning of a term is the same, in the same context, whether or not it is highlighted. It will be appreciated that same element can be described in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various examples given in this specification.

Without intent to further limit the scope of the disclosure, examples of instruments, apparatus, methods and their related results according to the examples of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Some portions of this description describe examples in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some examples, a software module is implemented with a computer program object comprising a computer-readable medium containing computer program code, which can be executed by a computer processor for performing any or all of the steps, operations, or processes described.

Examples may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Examples may also relate to an object that is produced by a computing process described herein. Such an object may comprise information resulting from a computing process, where the information is stored on a non-transitory, tangible computer readable storage medium and may include any implementation of a computer program object or other data combination described herein.

The language used in the specification has been principally selected for readability and instructional purposes, and it may not have been selected to delineate or circumscribe the subject matter. It is therefore intended that the scope of this disclosure be limited not by this detailed description, but rather by any claims that issue on an application based hereon. Accordingly, the disclosure of the examples is intended to be illustrative, but not limiting, of the scope of the subject matter, which is set forth in the following claims.

Specific details were given in the preceding description to provide a thorough understanding of various implementations of systems and components for a contextual connection system. It will be understood by one of ordinary skill in the art, however, that the implementations described above may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

It is also noted that individual implementations may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Client devices, network devices, and other devices can be computing systems that include one or more integrated circuits, input devices, output devices, data storage devices, and/or network interfaces, among other things. The integrated circuits can include, for example, one or more processors, volatile memory, and/or non-volatile memory, among other things. The input devices can include, for example, a keyboard, a mouse, a key pad, a touch interface, a microphone, a camera, and/or other types of input devices. The output devices can include, for example, a display screen, a speaker, a haptic feedback system, a printer, and/or other types of output devices. A data storage device, such as a hard drive or flash memory, can enable the computing device to temporarily or permanently store data. A network interface, such as a wireless or wired interface, can enable the computing device to communicate with a network. Examples of computing devices include desktop computers, laptop computers, server computers, hand-held computers, tablets, smart phones, personal digital assistants, digital home assistants, as well as machines and apparatuses in which a computing device has been incorporated.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

The various examples discussed above may further be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable storage medium (e.g., a medium for storing program code or code segments). A processor(s), implemented in an integrated circuit, may perform the necessary tasks.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the implementations disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for implementing a suspended database update system.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A computer-implemented method comprising:
    receiving ongoing conversation data that includes exchanged messages;
    applying a machine-learning model to the ongoing conversation data to generate a set of annotations for the messages, wherein an annotation of the set of annotations corresponds to a particular message, and wherein the annotation of the particular message includes a set of confidence scores corresponding to classifications;
    generating an estimated amount of confusion present in the classifications by analyzing the annotation and the set of confidence scores, wherein the estimated amount of confusion represents a level of confusion between a pair of the classifications;
    dynamically generating in real-time a graphical representation that includes a set of nodes and a set of edges, wherein two nodes represent the pair of classifications, wherein an edge connects the two nodes and represents the estimated amount of confusion between the pair of classifications, and wherein the graphical representation is generated as the ongoing conversation data continues to be received;
    receiving input corresponding to an interaction with the graphical representation;
    modifying a classification of the pair of the classifications according to the interaction, wherein modifying includes decreasing the estimated amount of confusion between the pair of classifications;

updating the machine-learning model based on the modified classification; and applying the updated machine-learning model to the ongoing conversation data to generate an updated set of annotations for the messages, wherein an updated annotation includes an updated confidence score corresponding to the modified classification.

2. The computer-implemented method of claim 1, wherein the ongoing conversation data include text data, audio data, or video data.

3. The computer-implemented method of claim 1, wherein the interaction includes merging two classifications of the classifications into a single merged classification.

4. The computer-implemented method of claim 1, wherein the machine-learning model is trained using sample conversation data and corresponding annotations.

5. The computer-implemented method of claim 1, further comprising:
dynamically modifying the graphical representation based on the modified classification, wherein the graphical representation is dynamically modified to include an updated set of nodes and an updated set of edges, wherein two updated nodes include the modified classification, and wherein an updated edge represents a re-estimated amount of confusion between the modified classification and another classification.

6. The computer-implemented method of claim 1, wherein generating the estimated amount of confusion includes determining a conditional probability associated with the pair of classifications, and wherein the conditional probability is determined based on a probability of a first classification of the pair of the classifications being selected after a previous selection of a second classification of the pair of classification.

7. A system comprising:
one or more processors; and
memory storing thereon instructions that, as a result of being executed by the one or more processors, cause the system to perform operations comprising:
receiving ongoing conversation data that includes exchanged messages;
applying a machine-learning model to the ongoing conversation data to generate a set of annotations for the messages, wherein an annotation of the set of annotations corresponds to a particular message, and wherein the annotation of the particular message includes a set of confidence scores corresponding to classifications;
generating an estimated amount of confusion present in the classifications by analyzing the annotation and the set of confidence scores, wherein the estimated amount of confusion represents a level of confusion between a pair of the classifications;
dynamically generating in real-time a graphical representation that includes a set of nodes and a set of edges, wherein two nodes represent the pair of classifications, wherein an edge connects the two nodes and represents the estimated amount of confusion between the pair of classifications, and wherein the graphical representation is generated as the ongoing conversation data continues to be received;
receiving input corresponding to an interaction with the graphical representation;
modifying a classification of the pair of the classifications according to the interaction, wherein modifying includes decreasing the estimated amount of confusion between the pair of classifications;
updating the machine-learning model based on the modified classification; and
applying the updated machine-learning model to the ongoing conversation data to generate an updated set of annotations for the messages, wherein an updated annotation includes an updated confidence score corresponding to the modified classification.

8. The system of claim 7, wherein the ongoing conversation data include text data, audio data, or video data.

9. The system of claim 7, wherein the interaction includes merging two classifications of the classifications into a single merged classification.

10. The system of claim 7, wherein the machine-learning model is trained using sample conversation data and corresponding annotations.

11. The system of claim 7, wherein the instructions further cause the system to perform operations comprising:
dynamically modifying the graphical representation based on the modified classification, wherein the graphical representation is dynamically modified to include an updated set of nodes and an updated set of edges, wherein two updated nodes include the modified classification, and wherein an updated edge represents a re-estimated amount of confusion between the modified classification and another classification.

12. The system of claim 7, wherein generating the estimated amount of confusion includes determining a conditional probability associated with the pair of classifications, and wherein the conditional probability is determined based on a probability of a first classification of the pair of the classifications being selected after a previous selection of a second classification of the pair of classification.

13. A non-transitory, computer-readable storage medium storing thereon executable instructions that, as a result of being executed by one or more processors of a computer system, cause the computer system to perform operations comprising:
receiving ongoing conversation data that includes exchanged messages;
applying a machine-learning model to the ongoing conversation data to generate a set of annotations for the messages, wherein an annotation of the set of annotations corresponds to a particular message, and wherein the annotation of the particular message includes a set of confidence scores corresponding to classifications;
generating an estimated amount of confusion present in the classifications by analyzing the annotation and the set of confidence scores, wherein the estimated amount of confusion represents a level of confusion between a pair of the classifications;
dynamically generating in real-time a graphical representation that includes a set of nodes and a set of edges, wherein two nodes represent the pair of classifications, wherein an edge connects the two nodes and represents the estimated amount of confusion between the pair of classifications, and wherein the graphical representation is generated as the ongoing conversation data continues to be received;
receiving input corresponding to an interaction with the graphical representation;
modifying a classification of the pair of the classifications according to the interaction, wherein modifying includes decreasing the estimated amount of confusion between the pair of classifications;

updating the machine-learning model based on the modified classification; and applying the updated machine-learning model to the ongoing conversation data to generate an updated set of annotations for the messages, wherein an updated annotation includes an updated confidence score corresponding to the modified classification.

14. The non-transitory, computer-readable storage medium of claim 13, wherein the ongoing conversation data include text data, audio data, or video data.

15. The non-transitory, computer-readable storage medium of claim 13, wherein the interaction includes merging two classifications of the classifications into a single merged classification.

16. The non-transitory, computer-readable storage medium of claim 13, wherein the machine-learning model is trained using sample conversation data and corresponding annotations.

17. The non-transitory, computer-readable storage medium of claim 13, wherein the executable instructions further cause the computer system to perform operations comprising:

dynamically modifying the graphical representation based on the modified classification, wherein the graphical representation is dynamically modified to include an updated set of nodes and an updated set of edges, wherein two updated nodes include the modified classification, and wherein an updated edge represents a re-estimated amount of confusion between the modified classification and another classification.

18. The non-transitory, computer-readable storage medium of claim 13, wherein generating the estimated amount of confusion includes determining a conditional probability associated with the pair of classifications, and wherein the conditional probability is determined based on a probability of a first classification of the pair of the classifications being selected after a previous selection of a second classification of the pair of classification.

* * * * *